United States Patent
Yang et al.

(10) Patent No.: US 11,935,106 B2
(45) Date of Patent: Mar. 19, 2024

(54) SYSTEM AND METHOD FOR PRODUCT RECOMMENDATION BASED ON MULTIMODAL FASHION KNOWLEDGE GRAPH

(71) Applicants: Beijing Wodong Tianjun Information Technology Co., Ltd., Beijing (CN); JD.com American Technologies Corporation, Mountain View, CA (US)

(72) Inventors: Shanglin Yang, Mountain View, CA (US); Shizhu Liu, Mountain View, CA (US); Min Li, Mountain View, CA (US); Huiman Hou, Beijing (CN); Qin Wang, Beijing (CN); Jixing Wang, Beijing (CN); Yuhao Zhang, Beijing (CN); Zizhen Wang, Beijing (CN); Xin Li, Beijing (CN); Hui Zhou, Sunnyvale, CA (US)

(73) Assignees: BEIJING WODONG TIANJUN INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 257 days.

(21) Appl. No.: 17/138,147

(22) Filed: Dec. 30, 2020

(65) Prior Publication Data
US 2022/0207587 A1  Jun. 30, 2022

(51) Int. Cl.
*G06Q 30/0601* (2023.01)
*G06F 16/903* (2019.01)
(Continued)

(52) U.S. Cl.
CPC ... *G06Q 30/0631* (2013.01); *G06F 16/90335* (2019.01); *G06N 3/02* (2013.01);
(Continued)

(58) Field of Classification Search
CPC . G06Q 30/0601–0645; G06Q 30/0631; G06Q 30/0627; G06K 9/6215
(Continued)

(56) References Cited

U.S. PATENT DOCUMENTS 9,087,088 B1 * 7/2015 Bose ............... G06F 16/22
9,881,226 B1 * 1/2018 Rybakov .............. G06T 7/11
(Continued)

FOREIGN PATENT DOCUMENTS

| CN | 107861972 A | 3/2018 |
| CN | 110245204 A | 9/2019 |

(Continued)

OTHER PUBLICATIONS

James Le, Recommending Similar Fashion Items with Deep Learning, Floydhub, Feb. 7, 2019 (Year: 2019).*
(Continued)

*Primary Examiner* — Marissa Thein
*Assistant Examiner* — Anna Mae Mitros
(74) *Attorney, Agent, or Firm* — Scully, Scott, Murphy & Presser, P.C.

(57) ABSTRACT

A method and a system for recommending a target garment matching an inputted garment. The method includes: extracting attributes from text description and image of the inputted garment to obtain extracted attributes; querying a knowledge graph using the extracted attributes to obtain matched attributes; retrieving candidate products from a garment pool using the matched attributes; extracting features from the inputted garment and the candidate products; determining the target garment from the candidate products
(Continued)

based on grading scores between the features of the inputted garment and the features of the candidate products; and recommending the target garment. The knowledge graph includes nodes corresponding to type of clothes, category of clothes, attribute keys, values of attribute keys, context keys, values of context keys, combination of the values of the attribute keys and the type of clothes, and combination of the value of the attribute keys and the category of clothes.

15 Claims, 13 Drawing Sheets

(51) Int. Cl.
    *G06F 18/22*     (2023.01)
    *G06N 3/02*     (2006.01)
    *G06V 10/56*     (2022.01)

(52) U.S. Cl.
    CPC ......... *G06Q 30/0627* (2013.01); *G06F 18/22* (2023.01); *G06V 10/56* (2022.01)

(58) Field of Classification Search
    USPC ..................................... 705/26.1–27.2, 26.63
    See application file for complete search history.

(56) References Cited

U.S. PATENT DOCUMENTS

| | | | | |
|---|---|---|---|---|
| 10,614,342 | B1* | 4/2020 | Lorbert | ............. G06V 10/82 |
| 2018/0157681 | A1* | 6/2018 | Yang | ............. G06F 16/90332 |
| 2018/0276727 | A1 | 9/2018 | Patel et al. | |
| 2020/0143454 | A1 | 5/2020 | Ananthanarayana et al. | |
| 2020/0257976 | A1* | 8/2020 | Polanía Cabrera | .................... G06Q 30/0643 |
| 2020/0311798 | A1* | 10/2020 | Forsyth | ............. G06V 30/19147 |
| 2021/0182934 | A1* | 6/2021 | Semarjian | .......... G06Q 30/0631 |

FOREIGN PATENT DOCUMENTS

| | | |
|---|---|---|
| CN | 110458292 A | 11/2019 |
| WO | 2018165239 A1 | 9/2018 |

OTHER PUBLICATIONS

PCT/CN2021/129793 International Search Report, dated Feb. 10, 2022.

Pongsate Tangseng, Kota Yamaguchi, and Takayuki Okatani, Recommending outfits from personal closet, 2017 IEEE International Conference on Computer Vision Workshop (ICCVW), IEEE, 2017 (arXiv:1804.09979).

Zunlei Feng, Zhenyu Yu, Yezhou Yang, Yongcheng Jing, Junxiao Jiang, and Mingli Song, Interpretable partitioned embedding for customized multi-item fashion outfit composition, Proceedings of the 2018 ACM on International Conference on Multimedia Retrieval, 2018, 143-151 (arXiv:1806.04845).

Xishan Zhang, Jia Jia, Ke Gao, Yongdong Zhang, Dongming Zhang, Jintao Li, and Qi Tian, Trip outfits advisor: location oriented clothing recommendation, IEEE Transactions on Multimedia, 2017, 19(11):2533-2544.

Yufan Wen, Xiaoqiang Liu, and Bo Xu, Personalized clothing recommendation based on knowledge graph, 2018 International Conference on Audio, Language and Image Processing (ICALIP), 2018.

Ashish Vaswani, Noam Shazeer, Niki Parmar, Jakob Uszkoreit, Llion Jones, Aidan N. Gomez, Lukasz Kaiser, and Illia Polosukhin, Attention is all you need, 31st Conference on Neural Information Processing Systems (NIPS 2017).

* cited by examiner

FIG. 2B

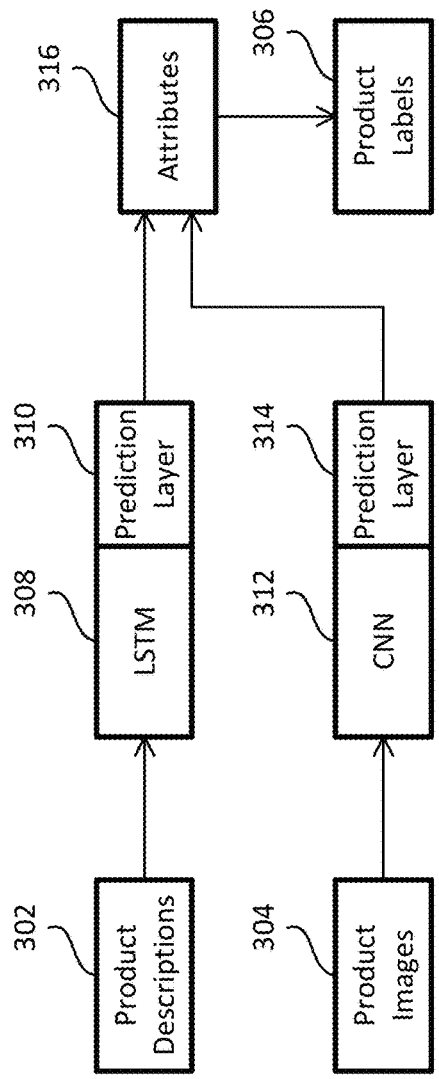
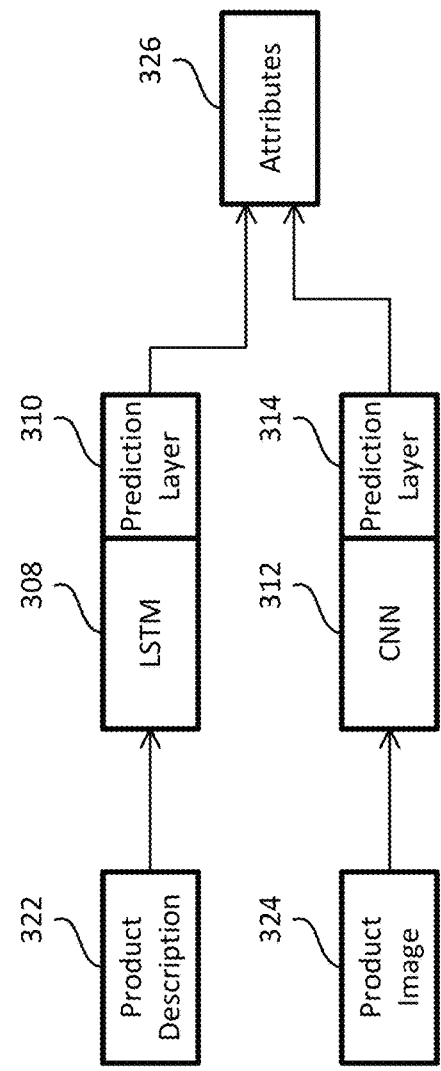

SYSTEM AND METHOD FOR PRODUCT RECOMMENDATION BASED ON MULTIMODAL FASHION KNOWLEDGE GRAPH

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to product recommendation, and more particularly to systems and methods for recommending an outfit having a set of garments, where the recommendation is based on multimodal fashion knowledge graph, feature matching, and fashion trend.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With rapid growth of online fashion market, demand for effective fashion recommendation systems has never been greater. Further, businesses and consumers in the fashion market not only care about matching outfits provided by the recommendation systems, but often intent to comprehend the reasons for the recommendation.

Nowadays, the application of deep learning methods in the recommendation has drawn many people's attention. Meanwhile, some work has also focused on recommendations that use external knowledge graphs (KGs) to supplement content-based recommendation. However, considering rapidly evolving fashion styles, high complexity of fashion attributes and sensitivity towards subjective factors, it is still a challenge to understand the logic behind the outfit recommendation.

Therefore, an unaddressed need exists in the art to address the aforementioned deficiencies and inadequacies.

SUMMARY

In certain aspects, to improve the effectiveness and persuasiveness of the outfit recommendation systems, the present disclosure provides a method to construct fashion knowledge graph from dynamic multimodal data streams, which can be used to generate fashion outfit recommendation with explanation. In certain embodiments, the method considers both fashion trending in the fashion market and compatibility between different garment in an outfit.

In certain aspects, the present disclosure relates to a method for recommending a target garment or an outfit having several target garments, and the target garments are compatible with an inputted garment. In certain embodiments, the method includes:

extracting, by a computing device, attributes from text description and image of the inputted garment to obtain extracted attributes;

querying, by the computing device, a knowledge graph using the extracted attributes to obtain matched attributes;

retrieving, by the computing device, candidate products from a garment pool using the matched attributes;

extracting, by the computing device, features from the inputted garment and the candidate products;

determining, by the computing device, the target garment from the candidate products based on grading scores between the features of the inputted garment and the features of the candidate products; and recommending, by the computing device, the target garment.

The inputted garment may be a garment provided by a customer on an e-commerce platform, where the customer is looking for one or more garments that fit with the garment provided by the customer, and the e-commerce platform can then recommend the one or more garments to the customer; the inputted garment may also be a product reviewed or purchased by the customer on the e-commerce platform, where the review or purchase information is captured by the e-commerce platform, the e-commerce platform can correspondingly find one or more garments that fit with the garment reviewed or purchased by the customer, and recommend the one or more garments to the customer; the inputted garment can also be a new garment added to a store on the e-commerce platform by a store owner, where the addition of the new garment is captured by the e-commerce platform, the e-commerce platform can correspondingly find one or more garments that fits with the newly added garment, and recommend the one or more garments to the store owner. The store owner may present the newly added garments together with the recommended garments to customers in his tore. In certain embodiments, the recommended garments for the store owner are preferably selected from the garments available in his store.

In certain embodiments, when the recommendation is the outfit, the target garments in the outfit may be determined one by one from the candidate products. In certain embodiments, the outfit may require a combination of different types of garments, and the method determines one target garment for each type of the garments. Hereafter, garment and cloth may be used interchangeably, and can be, for example outwear, sweater, T-shirt, shirt, skirt, jeans, shoes, hat. In certain embodiments, the garment in the present disclosure may also be expanded to bags, sunglasses, watches, jewelries, etc. that are used as a components of a person's appearance.

In certain embodiments, the knowledge graph includes nodes corresponding to type of clothes, category of clothes, attribute keys, values of attribute keys, context keys, values of context keys, combination of the values of the attribute keys and the type of clothes, and combination of the value of the attribute keys and the category of clothes. The attribute keys may include sleeve-length, color, pattern, and dress length, etc., the values of attribute keys may include short-sleeve, red, blue, etc., the context keys may include gender, season, style, etc., the values of context keys may include woman, summer, casual, etc. The nodes are also named entities of the knowledge graph.

In certain embodiments, the knowledge graph includes edges between the nodes, the edges include "IsA" relationship representing attribute of one of the nodes belongs to a category of attribute of another one of the nodes, "PartOf" relationship representing attribution of one of the nodes is part of attribute of another one of the nodes, and "Matching_Score" relationship representing compatibility between attribution of two nodes.

In certain embodiments, matching score values of the "Matching_Score" relationships are optimized using garment outfit opinion from key opinion leaders (KOLs). In certain embodiments, the matching score values are determined by:

$$p(\text{node}_i,\text{node}_j)=(p'(\text{node}_i,\text{node}_j)+1)*T_i*T_j,$$

where $p'(\text{node}_i,\text{node}_j)$ is a previous matching score between the node i and the node j, $p(\text{node}_i,\text{node}_j)$ is a current matching score between the node i and the node j after training using a training outfit, $T_i$ is trending index of the node i, and $T_j$ is trending index of the node j.

In certain embodiments, the trending index is determined by:

$$T_i = \Sigma_{j=1}^{V} o(i,j,k)*KI_k,$$

where $$o(i, j, k) = \begin{cases} 1, & \text{if the } k_{th} \text{ KOL recomend the } i_{th} \text{ entity in the cloth } C_j \\ 0, & \text{otherwise} \end{cases},$$

$T_i$ is the trending index of the ith node or entity, $KI_k$ is impact index of kth of a total of n KOLs calculated by $$KI_k = \frac{F_k}{\max(F_1, F_2, \ldots, F_n)},$$

$F_k$ is a total number of followers of the kth KOL, and $C_j$ is the jth of a total of V number of garments recommended by the KOLs.

In certain embodiments, the step of querying the knowledge graph further includes providing a condition to narrow or expand the matched attributes, and the condition includes season of the target garment and style of the target garment. For example, if the customer provides "Winter" as a condition, the nodes that are closed related to winter may be removed from the matching nodes. If the customer provides "Casual" as a condition, but the inputted garment is a business style garment, and there are nodes highly related to "Casual" but have low matching scores to the nodes corresponding to the inputted garment, those nodes highly related to "Casual" may still be included in the matching nodes.

In certain embodiments, the step of extracting attributes and the step of extracting features are performed using at least one of a convolutional neural network (CNN) and a long-short term memory (LSTM). In certain embodiments, the CNN is used to process the image, and the LSTM is used to process the text description.

In certain embodiments, at least one of the nodes corresponding to the extracted attributes and at least one of the nodes corresponding to the matched attributes have a matching score value of the "Matching_Score" relationship, and the matching score value is greater than a predetermined threshold. In certain embodiments, the threshold is in a range of 0.2-0.8. In certain embodiments, the threshold is in a range of 0.4-0.6. In certain embodiments, the threshold is 0.5.

In certain embodiments, the step of recommending the target garment is performed by:

listing the target garment or the target outfit on a product webpage of the inputted garment; or pushing the target garment or the target outfit to a user purchased or reviewed the inputted garment; or displaying the target garment or the target outfit on the terminal of the customer.

In certain embodiments, the method further includes providing an explanation of recommending the target garment based on the matching between the extracted attributes and the matched attributes.

In certain embodiments, the target garment is an outfit having multiple garments that are compatible to the inputted garment. In certain embodiments, at least one of the multiple garments in the outfit is determined based on the inputted garment and the others of the multiple garments.

In certain aspects, the present disclosure relates to a system for recommending a target garment or a target outfit matching an inputted garment. In certain embodiments, the system includes a computing device, and the computing device has a processor and a storage device storing computer executable code. The computer executable code, when executed at the processor, is configured to:

extract attributes from text description of the inputted garment and image of the inputted garment to obtain extracted attributes;

query a knowledge graph using the extracted attributes to obtain matched attributes;

retrieve candidate products from a garment pool using the matched attributes;

extract features from the inputted garment and the candidate products;

determine the target garment from the candidate products based on grading scores between the features of the inputted garment and the features of the candidate products; and recommending the target garment.

In certain embodiments, the knowledge graph includes nodes corresponding to type of clothes, category of clothes, attribute keys, values of attribute keys, context keys, values of context keys, combination of the values of the attribute keys and the type of clothes, and combination of the value of the attribute keys and the category of clothes. In certain embodiments, the attribute keys include sleeve-length, color, pattern, dress length, etc. The values of attribute keys includes short-sleeve, red, blue, etc. The context keys includes gender, season, style, etc. The values of context keys include woman, summer and casual, etc.

In certain embodiments, the knowledge graph includes edges between the nodes, the edges include "IsA" relationship representing attribute of one of the nodes belongs to a category of attribute of another one of the nodes, "PartOf" relationship representing attribution of one of the nodes is part of attribute of another one of the nodes, and "Matching_Score" relationship representing compatibility between attribution of two nodes.

In certain embodiments, the matching score values are determined by:

$$p(\text{node}_i,\text{node}_j)=(p'(\text{node}_i,\text{node}_j)+1)*T_i*T_j,$$

where $p'(\text{node}_i,\text{node}_j)$ is a previous matching score between the node i and the node j, $p(\text{node}_i,\text{node}_j)$ is a current matching score between the node i and the node j after training using a training outfit, $T_i$ is trending index of the node i, and $T_j$ is trending index of the node j.

In certain embodiments, the trending index is determined by:

$$T_i = \Sigma_{j=1}^V o(i,j,k) * KI_k,$$

where $$o(i,j,k) = \begin{cases} 1, & \text{if the } k_{th} \text{ KOL recomend the } i_{th} \text{ entity in the cloth } C_j \\ 0, & \text{otherwise} \end{cases},$$

$T_i$ is the trending index of the ith node or entity, $KI_k$ is impact index of kth of a total of n key opinion leaders (KOLs) calculated by $$KI_k = \frac{F_k}{\max(F_1, F_2, \ldots, F_n)},$$

$F_k$ is a total number of followers of the kth KOL, and $C_j$ is the jth of a total of V number of garments recommended by the KOLs.

In certain embodiments, the computer executable code is configured to extract attributes and extract features from the text description using a long-short term memory (LSTM), and extract attributes and extract features from the image using a convolutional neural network (CNN).

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 2B schematically depicts result from searching a product pool using input keys obtained from product knowledge graph according to certain embodiments of the present disclosure.

FIG. 3A schematically depicts training of an attribution extractor according to certain embodiments of the present disclosure.

FIG. 3B schematically depicts extraction of product attributes by the well-trained attribute extractor according to certain embodiments of the present disclosure.

DETAILED DESCRIPTION

Figure 1:
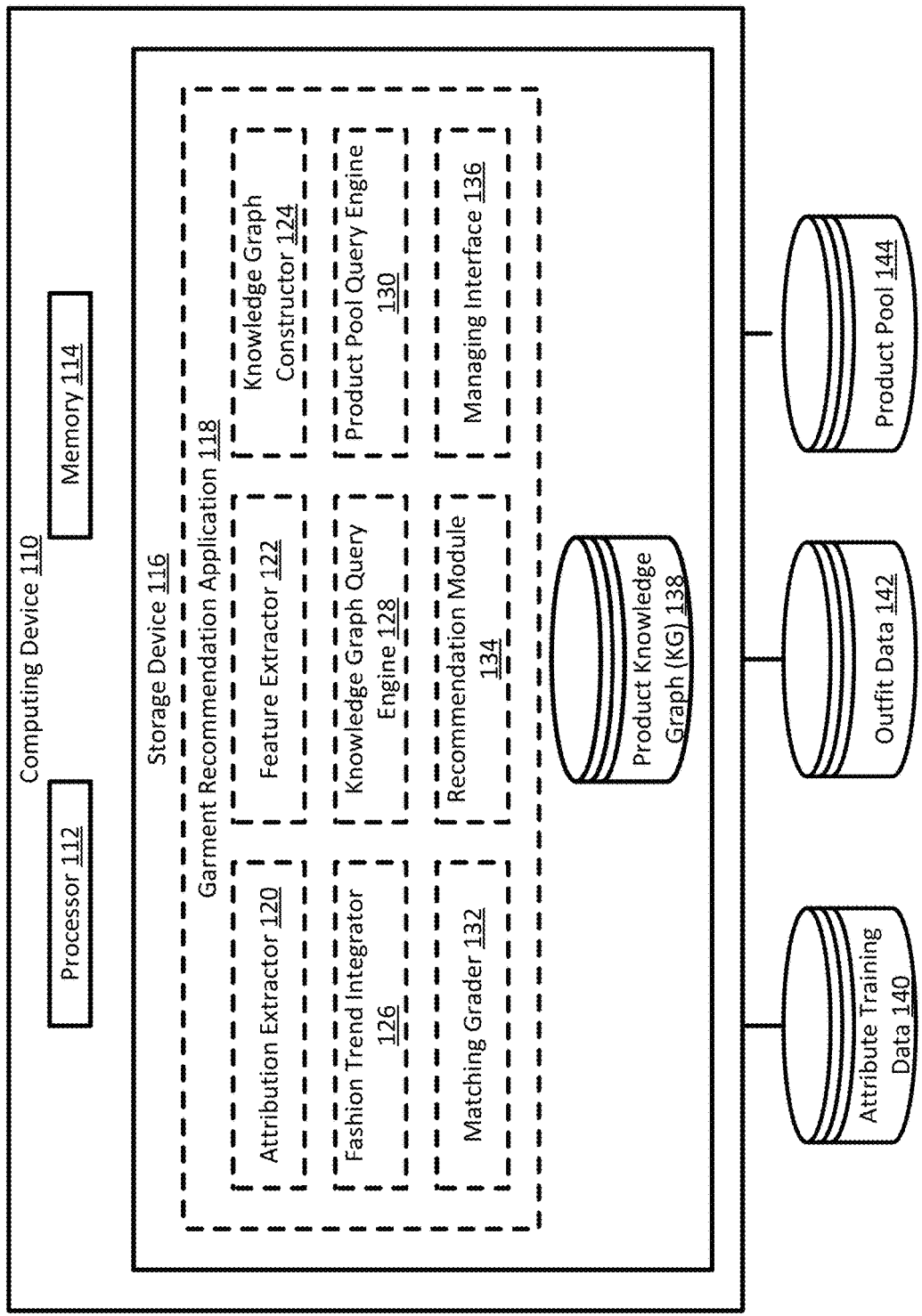
FIG. 1 schematically depicts a garment recommendation system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "plurality" means two or more. As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, for studying fashion outlet, one method is using deep learning to get latent features from garments and use the latent feature to infer compatibility. But the deep learning based method lacks extensibility and reasoning ability. The other method is using knowledge graph to capture relation between garment attributes. But the knowledge graph based method has problems working with fine-grained features and real products. Moreover, neither methods address the fast changing styles and trend in fashion domain.

In certain aspects, to address the above deficiencies, the present disclosure provides a garment outfit recommendation method using a dynamic multimodal fashion knowledge graph. On the one hand, the present disclosure designs a data collection pipeline to tracking the evolving fashion knowledge. On the other hand, the present disclosure designs a novel framework which incorporate both data-driven results from deep learning methods and guidance as well as constraints from knowledge graph to generate accurate and explainable fashion outfit recommendation. In particular, deep learning models help construct a fine-granular knowledge graph while the knowledge graph captures matching attributes which can be used to find product candidates matching the product in query. In addition, through the attributes associated with the matching product pairs, the disclosure can extract out the detailed matching scores between attributes from the knowledge graph. This provides an elaborated explanation of matching recommendation.

FIG. 1 schematically depicts a garment recommendation system according to certain embodiments of the present disclosure. As shown in FIG. 1, the system 100 includes a computing device 110, attribute training data 140, outfit data 142, and product pool 144. In certain embodiments, the computing device 110 may be a server computer, a cluster, a cloud computer, a general-purpose computer, or a specialized computer, which provides garment recommendation. In certain embodiments, the computing device 110 may communicate with other computing devices or services, so as to obtain product data or product pool from those computing devices. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media. In certain embodiments, the computing device 110 may provide an interface for each of a large number of user computing devices, such as personal computers, tablet, or smart phones, such that users can communicate with the computing device 110 via the interface, send conditions and query garment to the computing device 110, and receive recommendations generated by the computing device 110.

The attribute training data 140 is accessible to the computing device 110. The attribute training data 140 includes a number of training products, each training garment has a description text and an image, and the training garment is labeled with attributions. The labeled attributions may include, for example, product type, product category, product attribute, value of the product attribute, context attribute, value of the context attribute, and combinations thereof. In certain embodiments, the training products are garments, the product type includes top, bottom and footwear, the product category includes T-shirt, skirt, Jeans and sneaker, the product attributes include sleeve-length, color, patter and dress-length, the value of the product attribute include short-sleeve, floral, red and blue, the context attribute includes gender, season and style, the value of the context attribute includes woman, summer and casual, the combination of the attribute value and the cloth type include green_top and red_outwear, and the combination of the attribute value and the cloth category include green_shirt and blue_pants. In certain embodiments, the training data 140 is used to train attribution extractor and feature extractor.

The outfit data 142 is accessible to the computing device 110, and may be updated regularly. In certain embodiments, the outfit data 140 includes a large number of outfits. For example, 5,000-15,000 outfits. In certain embodiments, the number of outfits is about 6,000-7,000 or about 10,000. The outfits may be arranged by designers of the e-commerce platform, or provided by or collected from the designers in the fashion field. Each outfit includes 2-10 garments that are compatible with each other, and typically includes 3-5 garments that have different types. For example, an outfit may include a top, a bottom, a footwear, and a hat. Each product in each of the outfits has a product description and a product image. The product description and the product image may come from product database or product webpage, both of them may be maintained by the e-commerce platform. The outfit data 142 may store details about products in a big data platform, and the details may include the attributes described above in regard to the training data 140. Those attributes of the products in the outfit data 142 are embedded in the text and image of the products, but may not be labeled. In certain embodiments, the outfit data 142 is used to construct the knowledge graph that is used in garment recommendation. In certain embodiments, the outfit data 142 may further include negative outfit data, where several random selected garments form a negative outfit.

The product pool 144 is accessible to the computing device 110 and may be updated regularly. In certain embodiments, the product pool 144 is a database, and the database includes a large number of products that are indexed by stock keeping unit (SKU) or product identification (ID). In certain embodiments, the products in the product pool 144 have their descriptions and images stored. The description may include product title, product category, and other product attributes. In certain embodiments, the text description and the image of the product in the product pool 144 are processed to extract their attributes, and the disclosure matches these attributes to the nodes in the product knowledge graph 138, so as to obtain correspondence between the products in the product pool 144 with the attribute nodes of the product knowledge graph 138. In certain embodiments, a high percentage of the products in the outfit data 142 overlap with or has correspondence to a high percentage of the products in the product pool 144.

As shown in FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, solid-state drive (SSD) or any other types of data storage devices. In certain embodiments, the storage device 116 may be a local storage, a remote storage, or a cloud storage. In certain embodiments, the computing device 110 may have multiple storage devices 116, which may be identical storage devices or different types of storage devices, and the applications of the computing device 110 may be stored in one or more of the storage devices 116 of the computing device 110. In certain embodiments, the computing device 110 is a cloud computer, and the processor 112, the memory 114 and the storage device 116 are shared resources provided over the Internet on-demand.

As shown in FIG. 1, the storage device 116 includes a garment recommendation application 118 and a product knowledge graph 138. The garment recommendation application 118 is configured to construct and update the product knowledge graph 138, train its models, and recommend a garment or an outfit for an inputted garment. The garment recommendation application 118 includes, among other things, an attribution extractor 120, a feature extractor 122, a knowledge graph constructor 124, a fashion trend integrator 126, a knowledge graph query engine 128, a product pool query engine 130, a matching grader 132, a recommendation module 134, and a managing interface 136. In certain embodiments, the garment recommendation application 118 may include other applications or modules necessary for its operation. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the garment recommendation application 118 may be located at a remote computing device or distributed in a cloud.

Figure 2A:
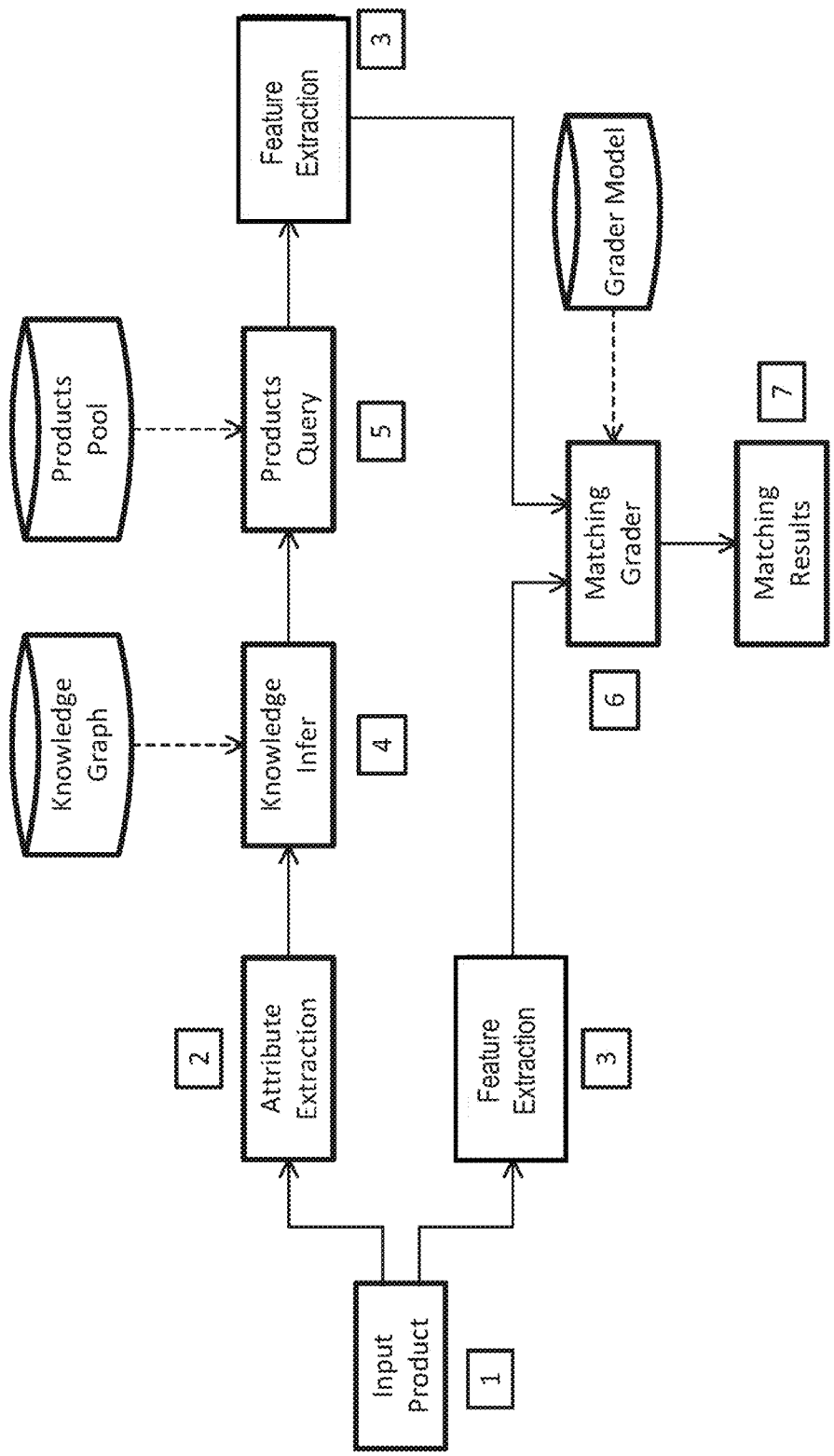
FIG. 2A schematically depicts a flow chart of recommending a garment according to certain embodiments of the present disclosure.

FIG. 2A schematically depicts architecture and data flow of a garment recommendation system according to certain embodiments of the present disclosure. In certain embodiments, the functional modules in FIG. 2A correspond to the modules in FIG. 1. As shown in FIG. 2A, an input product (1) is provided, which may be a garment a user has inputted or purchased, or a new garment a seller has provided. The input product may have a text description and an image.

Attribute extraction (2) is performed on the input data, that is, the text description and the image of the product, to extract attributes of the input product. The attribute extraction may be performed by a CNN based neural network model to process the image, an LSTM model to process the text description, and multimodal layers to process the resulted vectors from the CNN model and the LSTM model to obtain attributions. Feature extraction (3) is also performed on the input data to extract features of the input product. The feature extraction may be performed using the same CNN model and the LSTM model as in (2), and the resulted vectors from the CNN model and the LSTM model may be concatenated to form a feature vector, and the feature vector represents latent features of the input product.

The extracted attributions of the input product are matched to attribute nodes in knowledge graph to infer knowledge (4). The inferred knowledge are matched or compatible attributes nodes in the knowledge graph, or specifically the attributes corresponding to the nodes. In certain embodiments, the searching of matched or compatible attribute keys from the knowledge graph is performed with greedy search algorithm. For example, for each product in the outfit data 142, the disclosure can extract attributes using pretrained model and assign the value in the knowledge graph. Upon obtaining the attributes 'Beige Trenchcoat' from image and text of the input product, the disclosure can search alongside the knowledge graph by finding all connected vertices whose edges between have weights larger than the threshold. The entity of these connected vertices should be candidate attributes of matching products. For example, our matching garment's color could be gray or black, and the category could be sweater, pants. Here the threshold could be a matching score of 0.2-0.8. In certain embodiments, the threshold is about 0.4-0.6. In certain embodiments, the threshold is 0.5.

Figure 2B:
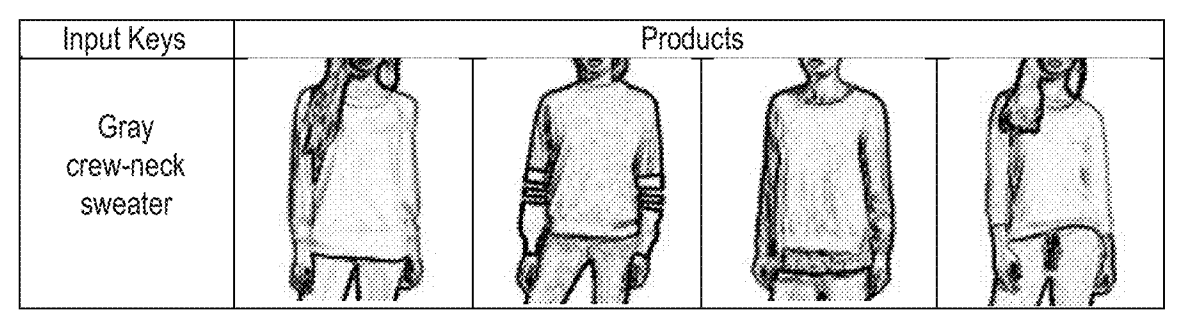

After inferring a list of attributes from the knowledge graph, the disclosure will search real products from the product pool (5) based on the combination of attribute as key words. FIG. 2B schematically depicts searching of the product pool using keys inferred from product knowledge graph. As shown in FIG. 2B, one of the inferred keywords or matched attributes from the product knowledge graph is "Gray Crew-neck Sweater," and the products having high matching to those keywords are listed. Kindly note the inferred attributes from the knowledge graph includes various information and can be used to generate querying keys. For example, based on information of the entities from the knowledge graph, the system knows that "Gray" is a color, "crew-neck" is a style, and "sweater" is a product name or product type. Accordingly, the system is able to combine the different information in a predetermined sequence, so as to construct the query of "Gray Crew-neck Sweater." Kindly note that the combination of the query is not limited to the above described format.

Referring back to FIG. 2A, each of the candidate products is compared to the input product to obtain a grading score. Specifically, for each candidate product, its latent features are extracted (3), the extracting model used is the same as the one used in extracting features from the input product. The extracted features from the input product and the extracted features from the candidate product is matched using a grader model (6). The grader model may be a self-attention based matching score predictor, which may include multi perceptron neural layers. After matching by the grader model, one of the candidate products that has the highest grading score with the input product is selected as the matching product. Because an outfit may include several products or garments, the above process can be repeated to obtain several matching garments. That is, after selecting the first candidate product, the grader model then calculates the grading score between the input product/first matching product and the other candidate products other than the first candidate product, so as to select a second matching product from the other candidate products. The second matching product has the highest grading score with the input product/first matching product other than the first candidate product. By repeating the above process, several matching product can be selected, and the several matching products and the input product form the outfit. For example, the model takes features from a given selected clothes list $\{E_1, E_2, \ldots, E_n\}$ and a possible candidate matching cloth C, then outputs the grading score S from 0 to 1 showing the compatibility between the candidate garment and the selected garments. The other possible candidate matching garment can be analyzed the same way. The disclosure then ranks the candidate garments using the grading scores, and choses the candidate garment having the highest grading score.

In certain embodiments, restrictions to the candidate products may be considered. For example, if the recommended outfit should include a top, an outwear, a bottom, a footwear, and a hat, and the inputted garment is a top, the system may first select all the outwears from the candidate products, and select the one outwear from the candidate products that has the highest grading score with the inputted garment. After that, the system may then select all the bottoms from the candidate products, and select the one bottom from the candidate products that has the highest grading score with the inputted garment and the selected outwear. The footwear and the hat can then be selected similar to the selection of the bottom, except that the existing entities are more and more.

The outfit is the matching result, and the outfit can then be provided to a customer, for example, a buyer that has purchased or reviewed the input product, a seller of the input product, or a writer for drafting an article of outfit.

In certain embodiments, the customer can also provide a condition to the system, such that the knowledge inference (4) can be performed using the conditions. The knowledge inference may be narrowed or expanded by the condition. For example, if the customer enters the season "winter" as an exception condition, the knowledge inference may avoid product attributes having high matching score with the node "winter." If the customer enters "casual" as a condition, the knowledge inference may be expanded to products having high matching score with the node "casual," although the input product attributes may only have weak connections with the node "casual."

Referring back to FIG. 1, the attribution extractor 120 is a multi-labels model that outputs garment semantic attributes. In certain embodiments, the attribution extractor 120 is trained using the attribute training data 140. FIG. 3A schematically shows training of the attribution extractor 120 according to certain embodiments of the present disclosure. The attribute training data 140 includes certain number of training products, the training products have their product descriptions 302, product images 304, and product labels 306. The product labels 306 labels attributes of the training products. In certain embodiments, the attribution extractor 120 includes an LSTM model 308 to process the product descriptions 302 and a CNN model 312 to process the product images 304. In certain embodiments, the last layer of the LSTM 308 model is a prediction layer 310, which converts the latent vector representation from the LSTM result to part of attributes 316; and the last layer of the CNN model 312 is a prediction layer 314, which converts the latent vector representation from the CNN result to part of attributes 316. The predictions from the LSTM model 308 and the CNN model 312 may have overlaps, and the combination of the LSTM prediction and the CNN prediction forms the attributes 316. In certain embodiments, the prediction layers 310 and 314 may be combined together. In this situation, the latent representations generated from the LSTM 308 and the CNN 312 can be concatenated, and converted by the combined prediction layer into attributes 316. There are different type of attributes, and the prediction layers 310 and 314 correspondingly are multi-labels models. By comparing the generated attributes 316 with the labeled attributes of the product 306, feeding back the comparison to the models, and repeating the training process, the attribution extractor 120, that is, the LSTM model 308 and the CNN model 312 can be well-trained.

After training, the well-trained attribution extractor 120 is configured to, during the construction of the product knowledge graph 138, extract attributions of garments from the outfit data 142, and send the outfit information and the extracted attributions to the knowledge graph constructor 124. In the outfit data 142, each outfit includes several garments that are compatible with each other, and each garment has its text description and its image. As shown in FIG. 3B, the product description 322 is inputted to the LSTM model 308, and the product image 324 is inputted to the CNN model 312, where the LSTM model 308 and the CNN model 312 are well-trained. The LSTM model 308 and the CNN model 312 process the product description and product image, respectively, and obtain the attributes 326 of the garments from the outfit data 142.

The attribution extractor 120 is further configured to, during garment recommendation, extract attributions of inputted product or garment, and send the extracted attribution to the knowledge graph query engine 128. The inputted garment has a text description and an image. The extraction of the attributes of the inputted garment is performed the same as that shown in FIG. 3B, except that there is no outfit information for the inputted garment.

The feature extractor 122 is configured to extract features of a product based on text description and image of the product, and make sure that the distances between the features from the same product are close enough. In certain embodiments, the feature extractor 122 includes an LSTM model and a CNN model that are similar to the LSTM model 308 and the CNN model 312 of the attribute extractor 120, except that the LSTM model and CNN model of the feature extractor 122 do not include the prediction layers 310 and 314. The models of the feature extractor 122 share the parameters with the well-trained models of the attribution extractor 120. The output of the attribution extractor 120 is attributes predicted from the latent representation vectors of the inputted product. In contrast, the output of the feature extractor 122 is the latent representation vectors of the inputted product. In certain embodiments, the attribution extractor 120 and the feature extractor 122 are the same model, and the output are extracted from different layers of the models when it functions as the attribution extractor or the feature extractor.

The knowledge graph constructor 124 is configured to, upon receiving the outfit information and the extracted attributes from the attribution extractor 120, construct the product knowledge graph 138. As described above, the attribution extractor 120 obtains the outfit information and extracts the product attributes from the outfit data 142. The knowledge graph constructor 124 is configured to build the product knowledge graph 138 such that the graph not only reflects the most recent fashion trend, but also maintains fine grain correlations between attributes analyzed by the deep learning models.

To construct the product knowledge graph 138, firstly, the knowledge graph constructor 124 is configured to define the vertices (entities) and edges (relations) between the vertices. In certain embodiments, the different types of vertices include the type of cloth (ClothType), the category of the cloth (ClothCategory), the attribute of the cloth (AttributeKey), the value of the attribute (AttributeValue), the context of the cloth (ContextKey), the value of the context, (ContextValue), the combination of the value of the attribute and the type of the cloth (AttrValue_ClothType), and the combination of the value of the attribute and the category of the cloth (AttrValue_ClothCategory). Examples of the vertices include:

ClothType: TOP, BOTTOM, FOOTWEAR, etc.
ClothCategory: T-shirt, Skirt, Jeans, Sneaker, etc.
AttributeKey: Sleeve-length, Color, Pattern, Dress-length, etc.
AttributeValue: Short-Sleeve, Floral, Blue, etc.
ContextKey: Gender, Season, Style, etc.
ContextValue: Woman, Summer, Casual, etc.
AttrValue_ClothType: Green_Top, Red_Outwear, etc.
AttrValue_ClothCategory: Green_Shirt, Blue_Pants, etc.

The knowledge graph constructor 124 is also configured to define three types of edges: IsA, PartOf, and Matching_Score. For example:

T-shirt IsA TOP,
Sleeve length PartOf T-shirt,
Red→Matching_Score 0.5→Green.

In certain embodiments, all the "IsA" relationship and the "PartOf" relationship are predefined, and the relationship of Matching_Score and the values are learned. In certain embodiments, the "IsA" relationship and the "PartOf" relationship are binary with the value "Yes" or "No."

In certain embodiments, the present disclosure is also configured to discover new vertices through deep learning based data driven approach. In certain embodiments, the system uses more features to cluster the products and get the undefined labels from text data. These labels are then added as new vertices into the knowledge graph.

The knowledge graph constructor 124 is further configured to assign the edges with weights. In certain embodiments, the knowledge graph constructor 124 is configured to define the matching score (Matching_Score) between vertices as a float value, and then calculate and assign weights on this type of edge. The edges' weights mainly come from two methods. In one method, the edges' weights are rule-based, and is pre-determined based on human knowledge. This method is used to initialize some of the edges' weights. For example, the matching score between "T-shirt" node and "Winter" node is assigned with a weight of 0.1, because we know that people normally do not wear T-shirt during winter. The number of rule-based weights in the product knowledge graph 138 is limited, and those weights are generally related to gender, season, and style nodes. In the other method, the edges' weights are data-driven, and is determined using a deep learning model prediction. The deep learning model used is the attribution extractor 120, which is a multi-labels model that outputs garment semantic attributes.

The well-trained attribution extractor 120 can be used to extract attributions of the product in the outfit data 142, and send the attributes and outfit information to the knowledge graph constructor 124. The knowledge graph constructor 124 is configured to, upon receiving the extracted product attributes and the outfit information, calculate the joint probability between pairs of vertices and use them as the edge weights. For example, the joint probability of red and blue is p(red$_{top}$, blue$_{bottom}$). When there are 100 outfits, and a red top garment and a blue bottom garment co-exist in 50 of the 100 outfits, the p(red$_{top}$, blue$_{bottom}$) is calculated as 50%, and the weight (Matching_score) between the vertex red$_{top}$ and the vertex blue$_{bottom}$ may be set at 0.5. In certain embodiments, the disclosure uses more features to cluster the products and get the undefined labels from context information. After adding more vertices, the disclosure may update the edge weights accordingly, for example, by repeating the complete or part of the knowledge graph construction process.

Figure 4A:
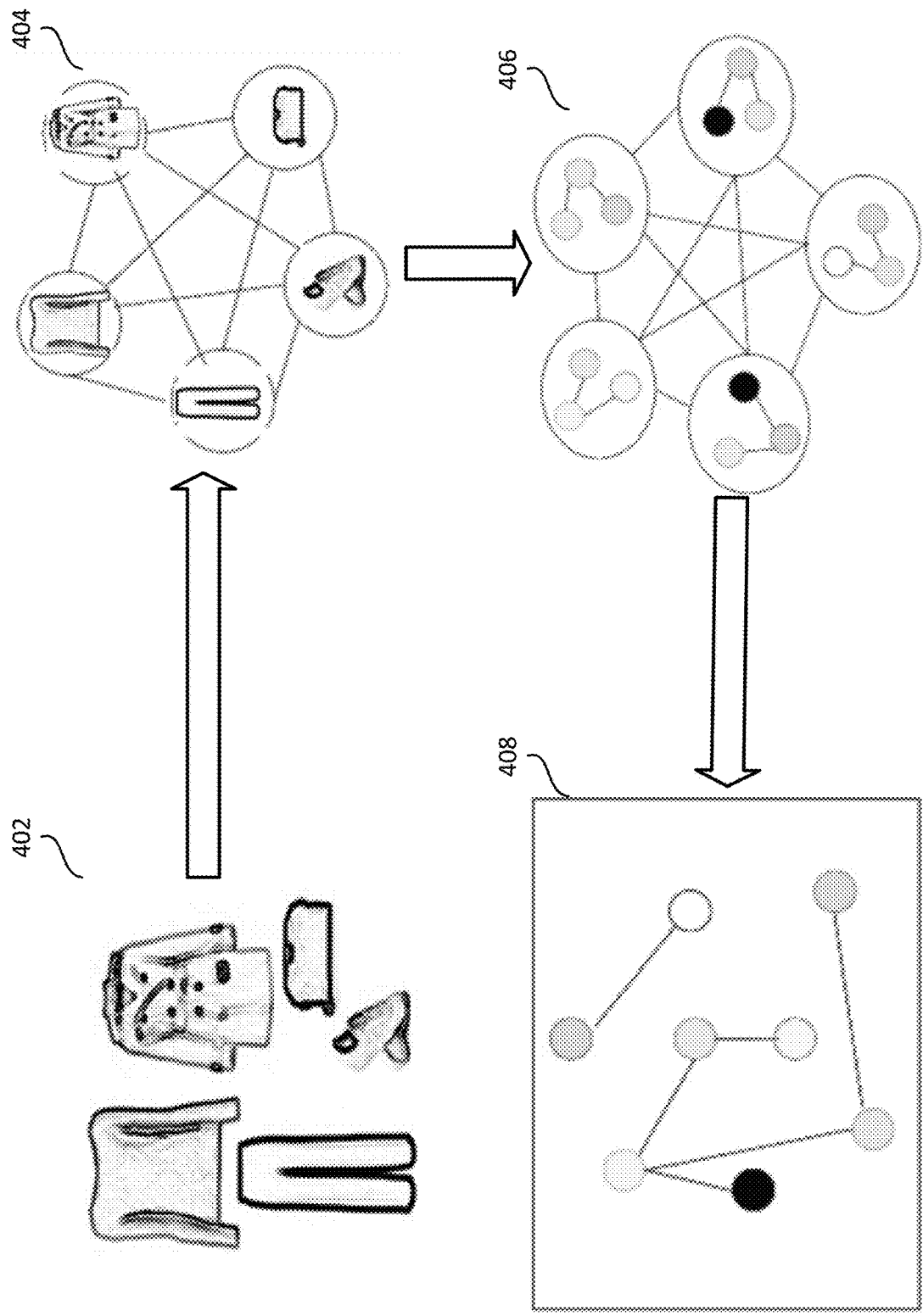
FIG. 4A schematically depicts construction of a knowledge graph according to certain embodiments of the present disclosure.

FIG. 4A schematically depicts the process of building a knowledge graph according to certain embodiments of the present disclosure, and the process is performed by the knowledge graph constructor 124. As shown in FIG. 4A, for a training outfit 402 from the outfit data 142, the outfit 402 includes a top, a bottom, a trench coat, a hat, and a pair of shoes that are compatible with each other. The outfit 402 can be represented as un-directed graph 404 in which each node represents one of the garments. The attributes extractor 120 then extract attributes from the corresponding image and text of the garments, and the garment nodes in the graph 404 can then be expanded to a sub_graph displaying the structured data. The expanded graph 406 thus include sub_graphs, each is an expansion of the garment node. Each sub-graph contains attribute nodes of the corresponding garments. The boundary of the sub_graphs in the expanded graph 406 is then broken, so that the nodes in different sub_graphs can be linked by edges. The knowledge graph constructor 124 then uses entity linking methods to map the sub_graph to the product knowledge graph 138 and then updates the edge weights accordingly using the equation:

$$p(\text{node}_i, \text{node}_j) = (p'(\text{node}_i, \text{node}_j) + 1)$$

Here p'(node$_i$,node$_j$) is the linking probability between node$_i$ and node$_j$ before using the outfit 402, and p(node$_i$, node$_j$) is the linking probability between the node$_i$ and node$_j$ after using the outfit 402, where the outfit 402 includes a link between the node$_i$ and node$_j$. After going through all the training data from the outfit data 142, the knowledge graph constructor 124 then normalizes the edge values to make the score range from 0 to 1 by:

$$p_{norm}(\text{node}_i, \text{node}_j) = \frac{p(\text{node}_i, \text{node}_j)}{\sum_{(i,k) \in E} p_{norm}(\text{node}_i, \text{node}_k)}$$

Here E is the edge set of graph. That is, $\Sigma_{(i,k) \in E} p_{norm}$(node$_i$,node$_k$) represents the summation of the probabilities between the node i and any of the k number of nodes that are linked to the node i. Each probability represents coexistence of the attributes i and j in one or more outfits. Therefore, the information from all the outfit data 142 is reflected in the completed product knowledge graph 138.

Figure 4B:
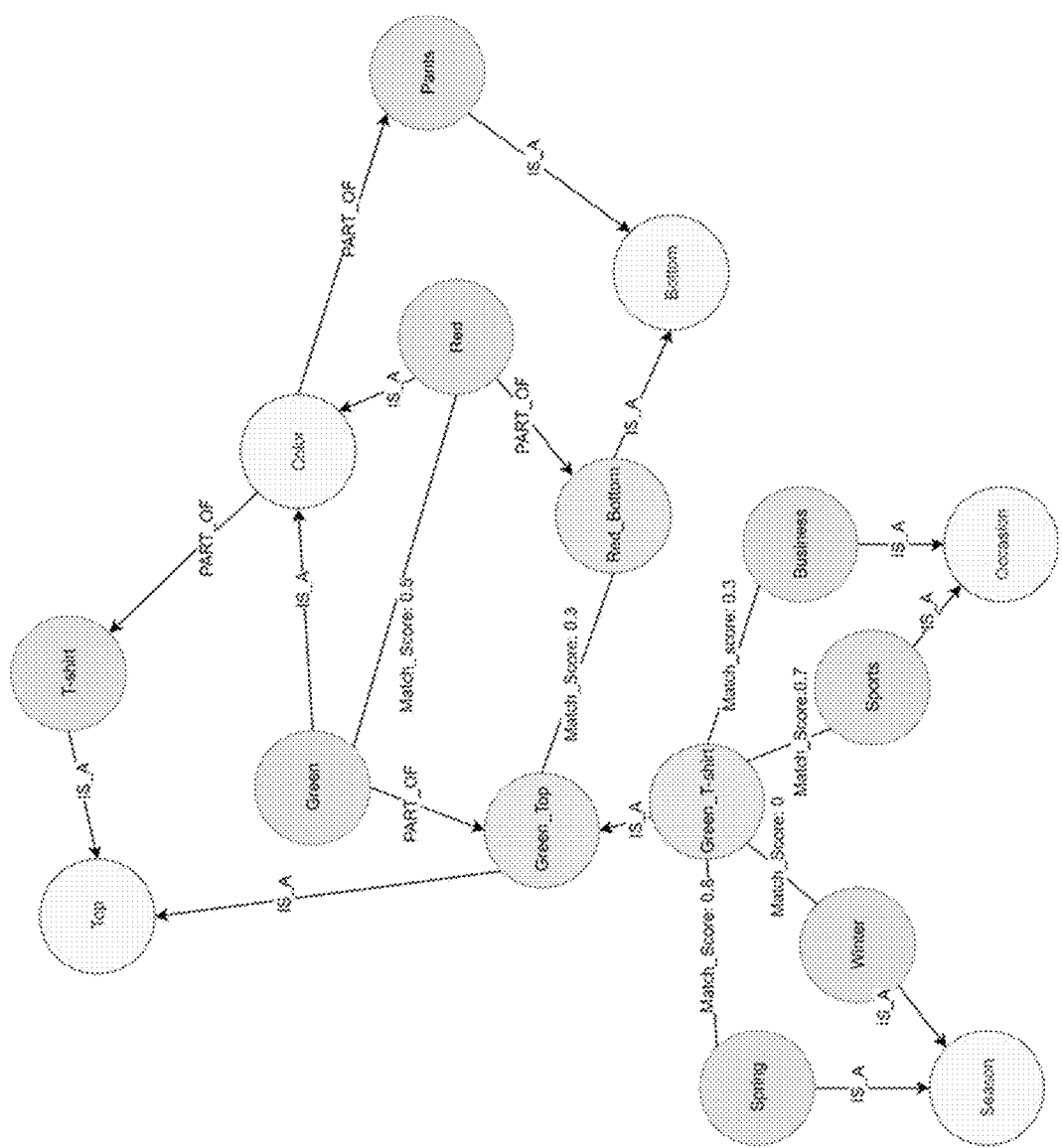
FIG. 4B schematically depicts a part of a knowledge graph according to certain embodiments of the present disclosure.

FIG. 4B schematically depicts a part of the constructed product knowledge graph 138 according to certain embodiments of the present disclosure. As shown in FIG. 4B, the graph includes ClothType nodes Top and Bottom, ClothCategory nodes T-shirt and Pants, AttributeKey nodes Color, AttributeValue nodes Red and Green, ContextKey nodes Season and Occasion, ContextValue nodes Spring, Winter, Sports and Business, AttriValue_ClothType nodes Green_Top and Red_Bottom, and AttrValue_ClothCategory Green_T-shirt. The types of nodes are not limited by the above described types, and each types of nodes include a large number of nodes. In certain embodiments, the number of nodes may be a few thousands for garments. There are three types of edges or relations between the nodes. In certain embodiments, the relation of IsA and PartOf are predefined by the knowledge graph constructor 124 or learned by another model. In certain embodiments, the edges of Matching_Score are calculated as described above. Some of the edges may also be predefined, especially for the edges related to "Season" and "Occasion." For example, the knowledge graph constructor 124 may define the Matching_Score between the Green_T-shirt to Spring, Winter, Sports and Business as 0.8, 0, 0.7, and 0.3, respectively. Accordingly, during the query of the product knowledge graph, a customer asks for a Winter outfit is unlikely to get a Green_T-shirt as one of the recommendations, unless the customer set a condition that he intends the winter outfit to include a T-shirt or a Green_T-shirt.

In certain embodiments, the present disclosure further includes outfit information from key opinion leaders (KOLs) into the product knowledge graph 138, and thus improves the above construction process of the product knowledge graph 138. The improvement is performed by combining the function of the fashion trend integrator 126 and the knowledge graph constructor 124.

Figure 4C:
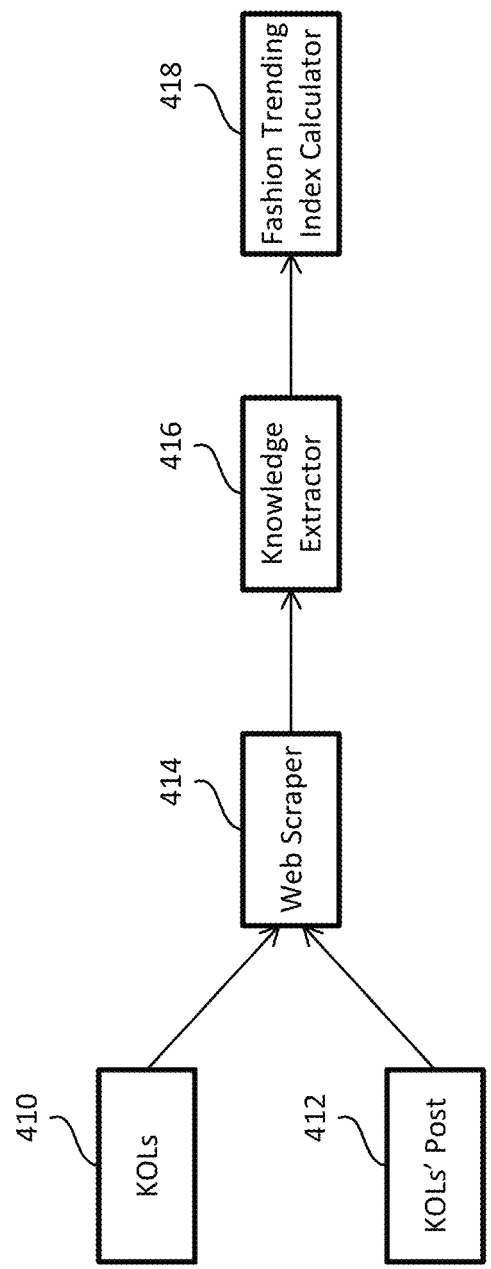
FIG. 4C schematically depicts enhancing a knowledge graph using key opinion leaders according to certain embodiments of the present disclosure.

The fashion integrator 126 is configured to obtain fashion trends, and provide fashion indexes for the fashion trends. The fashion indices correspond to certain nodes in the product knowledge graph 138. The indices can also be used by the knowledge graph constructor 124 during the calculation of the Matching_Score. Fashion plays important and sophisticated roles in various aspects: social, culture, identity, etc. We can roughly understand a fashion is a type of reaction common to a considerable number of people. It is common that fashion styles suggested by fashion experts, fashion icons or more popularly now by the key opinion leaders (KOLs) from the social media are imitated by people. In our system, we can analyze the fashion trend by tracking the KOLs' posts on social media platform. FIG. 4C schematically depicts a pipeline of mining KOL activities according to certain embodiments of the present disclosure. As shown in FIG. 4C, the pipeline is mainly composed of three components: (1) a web scraper 414 to collect the information of the KOLs 410 and the KOLs' posts 412; (2) a knowledge extractor 416 to map the fashion related entity from these posts; and (3) a fashion attribute trending index calculator 418 based on KOL impact.

The web scraper 414 is configured to obtain information of the KOLs 410. For n number of fashion key opinion leads $\{K_1, K_2, \ldots, K_n\}$, from social media platform, the disclosure can get the corresponding number of followers for the KOLs $\{F_1, F_2, \ldots, F_n\}$, where $K_n$ is the nth KOL, and $F_n$ is the number of followers for the $K_n$. The impact index of the KOLs can be calculated by $$KI_i = \frac{F_i}{\max(F_1, F_2, \ldots, F_n)}.$$

Therefore, for the KOL that has the highest number of followers, his impact index would be 1.

The web scraper 414 is further configured to collect these KOL's posts in a given period, such as the last one month, the last three months, the last six months, or the last year, and obtain garment or garments that are recommended or praised by the KOLs. Kindly note that the web scraper 414 may not need to collect outfit information, and the garments recommended by the KOLs are processed individually. The obtained V number of garments or clothes presented in the posts are $\{C_1, C_2, \ldots, C_V\}$. The knowledge extractor 416 is configured to compare the garments to the knowledge graph, and maps the V number of garments to the M number of attribute entities in the product knowledge graph 138. Each cloth or garment may have different attributes, those attributes may be parsed into vectors for easy process. In certain embodiments, one recommended cloth may have a total score of 1, and the score is divided to the attributes of the cloth. For example, if a white cotton cartoon cloth has three attributes white, cotton and cartoon corresponding to three attribute nodes in the product knowledge graph 138, each of the three attributes may be assigned a value of ⅓.

After that, the fashion trending index calculator 418 is configured to calculate the trending index TL for each of the M attribute entities. The calculation is performed by:

$$T_i = \Sigma_{j=1}^{V} o(i,j,k) * KI_k,$$

where $$o(i, j, k) = \begin{cases} 1, & \text{if the } k_{th} \text{ KOL recomend the } i_{th} \text{ entity in the cloth } C_j \\ 0, & \text{otherwise} \end{cases}$$

With the trending index available for the attributes, the above calculating of Matching_Score between the nodes by the knowledge graph constructor 124 can be replaced by:

$$p(node_i, node_j) = (p'(node_i, node_j) + 1) * T_i * T_j,$$

Here $p'(node_i, node_j)$ is the linking probability between the nodes i and j, and $T_i$ and $T_j$ are the trending index of the nodes i and j. By incorporating trend indexes in the calculating of matching scores, the relation between the nodes not only reflects the compatibility between the attribute nodes, but also reflects the current fashion trend of the attributes. In certain embodiments, the fashion trend integrator 126 is further configured to repeat the process shown in FIG. 4C with the most current posts and KOLs, so as to update the trending index of the attribute nodes, and subsequently update the matching scores between the nodes.

When the attribution extractor 120 and the feature extractor 122 are well-trained using the attribute training data 140, and the product knowledge graph 138 is constructed by the knowledge graph constructor 124 and the fashion trend integrator 126 using the outfit data 142 and the KOL posts, the garment recommendation application 118 is ready to recommend garments or clothes for a customer. The recommendation may be triggered by a query from a customer using an inputted garment, a review or purchase of the inputted garment by the customer, or the addition of the inputted garment to a store. Consequently, the knowledge graph query engine 128, the product pool query engine 130, the matching grader 132 and the recommendation module 134 work together to provide the recommendation.

The knowledge graph query engine 128 is configured to, upon receiving the inputted garment from the customer, instruct the attribute extractor 120 to extract attributes from the inputted garment, use the extracted attributes to query the product knowledge graph 138 to obtain matched attributes, and send the matched attributes to the product pool query engine 130. At the same time, the knowledge graph query engine 128 is also configured to, upon receiving the inputted garment from the customer, instruct the feature extractor 122 to extract features from the inputted garment, and send the extracted features to the matching grader 132. The inputted garment has text description of the garment and image of the garment. The attribute extractor 120 and the feature extractor 122 each may include a CNN model to process the image and an LSTM model to process the text. When the extracted attributes of the input product from the attribute extractor 120 are available, the extracted attributes are matched to the product knowledge graph.

Figure 5:
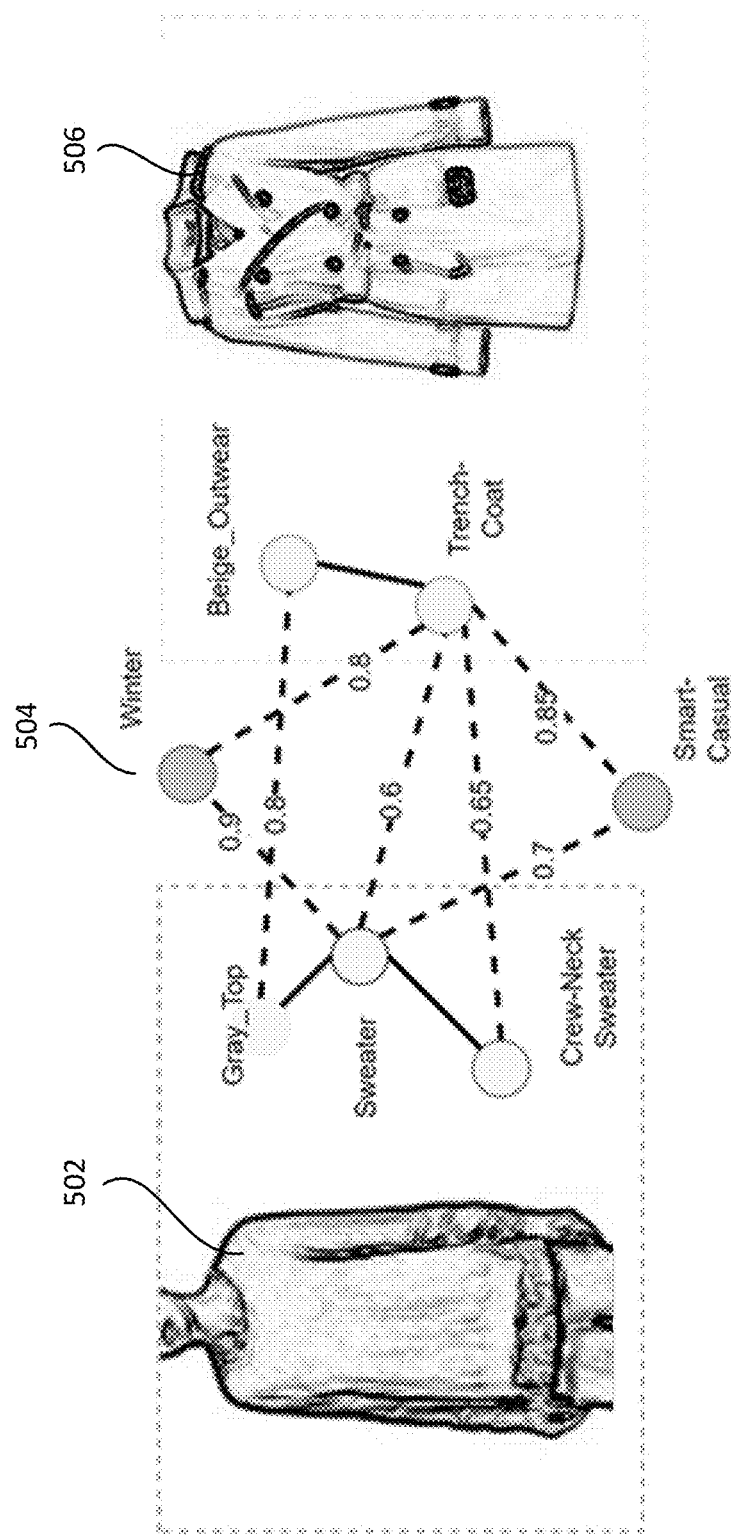
FIG. 5 schematically depicts querying a knowledge graph using extracted attributes according to certain embodiments of the present disclosure.

FIG. 5 schematically depicts matching the extracted attributes to the product knowledge graph 138 according to certain embodiments of the present disclosure. As shown in FIG. 5, the inputted garment 502 may be a gray-colored crew-neck sweater, and the extracted attributes of the garment 502 may include Gray, Top, Sweater and Crew-Neck. When the knowledge graph query engine 128 maps the extracted attributes to the product knowledge graph 138, the mapped attribute nodes may include Gray, Top, Sweater, Crew-Neck, Gray_Top, and Crew-Neck Sweater. Those mapped attribute nodes may be named as a sub-graph. The knowledge graph query engine 128 then looks for attribute nodes that have matching scores with the mapped nodes that equal to or are greater than a threshold. The threshold may be in a range of 0.2-0.8, or in a range of 0.4-0.6. In certain embodiments, the threshold is 0.5. The attribute nodes having high matching scores with the mapped nodes are named matched nodes or matched attributes. The matched nodes, for example, include Winter, Smart-Casual, Beige_Outwear, and Trench-Coat. The matched nodes Winter and Smart-Casual are also related to the Trench-Coat with high matching scores 0.8 and 0.85, respectively. Those matched attribute nodes Beige_Outwear and Trench-Coat may form a sub-graph, where the season type of node "Winter" and style type of node "Smart-Casual" are excluded from the sub-graph. Both the number of direct and indirect connections of the matched nodes to the mapped nodes and the matching scores for the connections are considered during the selection of the matched nodes. Here the Trench-Coat may be selected, and the Trench-Coat node may correspond to a large number of garment, which may include a trench-coat 506.

In certain embodiments, the node matching for the inputted garment is close type. That is, if a node of the inputted garment is a combination node, the matching will be performed to find a combination node that are compatible with the combination node of the inputted garment. If a node of the inputted garment is a type of cloth "Sweater," the matching will be performed to find a type of cloth such as a "Jacket" node. If a node of the inputted garment is a color such as "Red," the matching will be performed to find a color node such as the node "Green" that has the highest matching score to the node "Red." In certain embodiments, the matched nodes are preferably an attribution combining nodes that has two or more attributes, such as "Beige_Outwear" or "Trench_Coat."

The product pool query engine 130 is configured to, upon receiving the selected matched nodes or attributes corresponding to the nodes, such as the Trench-Coat, use the selected matched nodes to query the product pool 144. For example, the Trench-Coat node has the attribution of trench-coat, and the products in the product pool 144 that have the attribution of trench-coat are selected as candidate garments, which could be a large number of trench-coats. In certain embodiments, both the Beige_Outwear node and the Trench-Coat node are selected matched nodes, and the candidate garments may be the overlapped products that correspond to both the Beige_Outwear node and the Trench-Coat node, such that the total number of candidate garments is reduced. In certain embodiments, the number of candidate products can also be increased by combining the products corresponding to the Beige_Outwear node and the products corresponding to the Trench_Coat node. In certain embodiments, the product pool query engine 130 may also include several types of candidate products, such as top garment candidates, bottom garment candidates, outwear garment candidates, footwear candidates, and hat candidates. Each type of candidates are presented by a respective list ranking the matching scores between the candidate garments with the query attribute nodes. The product pool query engine 130 is further configured to, after obtaining the candidate garments, instruct the feature extractor 122 to extract features from each of the candidate garments, and send the extracted features to the matching grader 132.

Figure 6A:
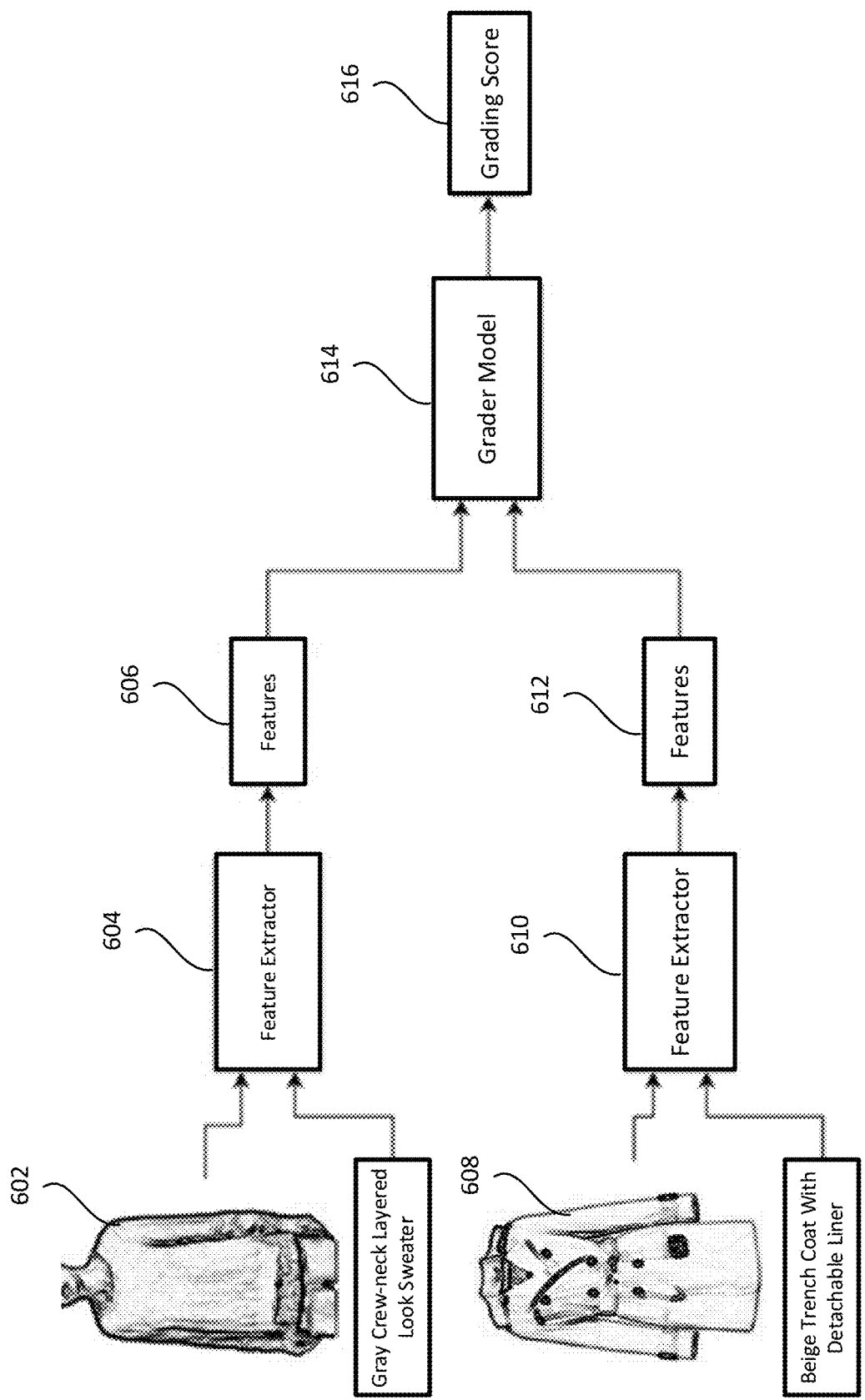
FIG. 6A schematically depicts evaluation of matching between an inputted garment and a candidate garment according to certain embodiments of the present disclosure.

The matching grader 132 is configured to, upon receiving the extracted features of the inputted garment and the extracted features of one of the candidate garments from the feature extractor 122, grading the match between the inputted garment and the candidate garment to obtain a grading score. FIG. 6A schematically depicts a process of grading. As shown in FIG. 6A, for the inputted garment 602 having an image and a text of "Gray Crew-neck Layered Look Sweater," the feature extractor 604 extracts feature 606 from the image and the text. Further, for the candidate garment 608 having an image and a text of "Beige Trench Coat With Detachable Liner," the feature extractor 610 extracts features 612. Both the feature extractor 604 and the feature extractor 610 may be the feature extractor 122 shown in FIG. 1. After obtaining the features 606 of the inputted garment 602 and the features 612 of the candidate garment 608, the grader model 614 compares the features 606 and the features 612 to obtain a grading score 616, which indicates the compatibility between the inputted garment and the candidate garment. The grader model 614 may be the matching grader 132 or the main model of the matching grader 132. The garments shown in FIG. 6A match well because they have high correlations through multiple attributes. For example, both are worn at the same season which is winter, and have the same style which is smart casual. Moreover, "Trench-Coat" has high matching score to "Sweater" and "Crew-Neck Sweater," and "Gray_Top" has high matching score to "Beige_Outwear," as shown in FIG. 5.

Figure 6B:
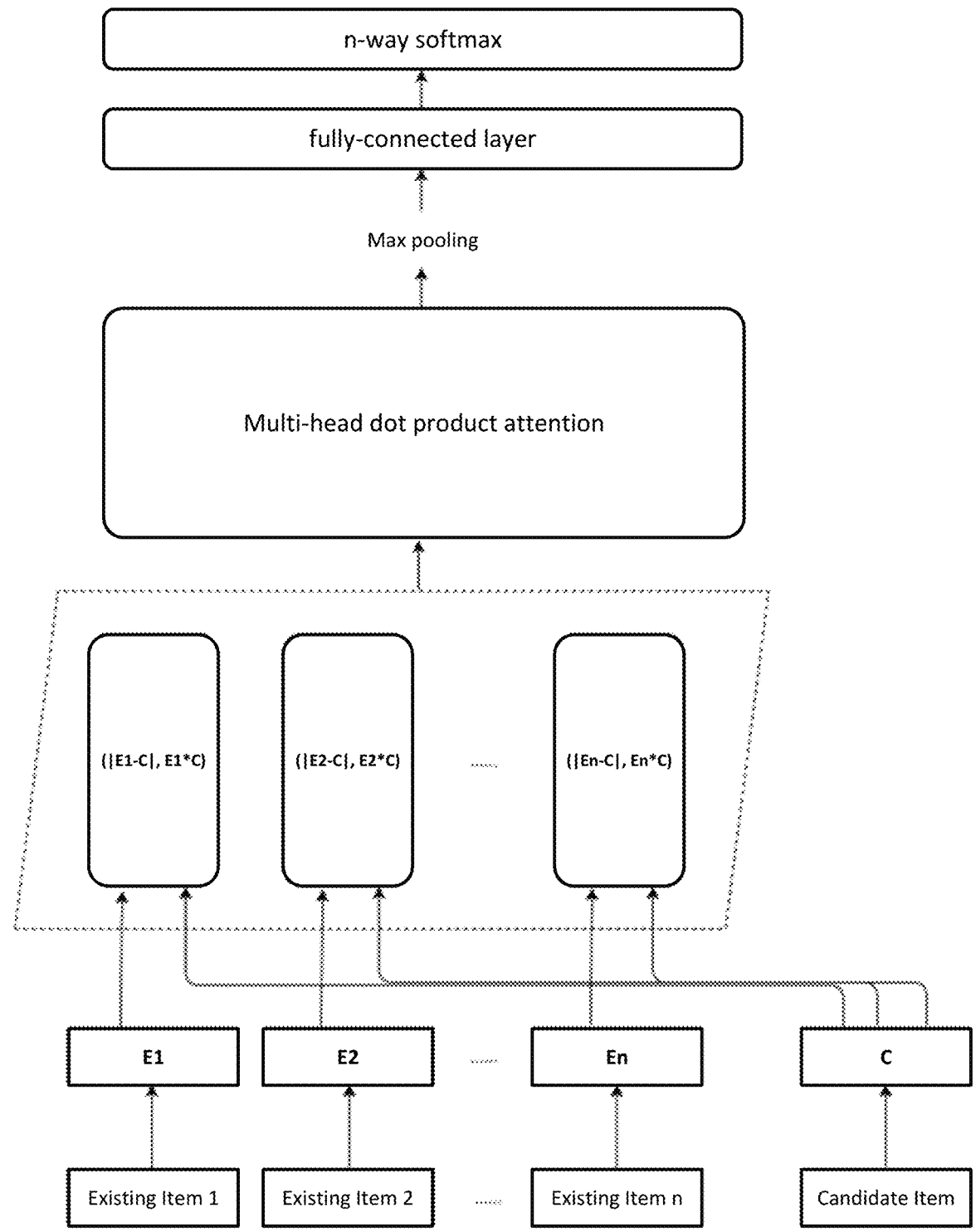
FIG. 6B schematically depicts multi-head attention based matching prediction according to certain embodiments of the present disclosure.

In certain embodiments, the matching between the inputted garment and one candidate garment is not a straightforward one-to-one comparison, but related to the other previously selected candidate garments in the recommended outfit. For example, if a sweater is provided as the inputted garment, the recommended outfit may be defined to include an outwear such as a trench-coat, a bottom such as jeans, a footwear such as a pair of boots and a hat that are compatible with the sweater. When the trench-coat is selected from the candidate garments as one component of the outfit, the selection of the other component-for example the jeans, is related to both the sweater and the selected trench-coat. FIG. 6B schematically depicts a model structure and data flow of the matching grader 132 according to certain embodiments of the present disclosure. In certain embodiments, the matching grader 132 is an inference model with multi perceptron neural layers. The matching grader 132 at first uses a feature-extractor model to extract latent features from the image as well as text of products. The model takes features from a given selected clothes list $\{E_1, E_2, \ldots, E_n\}$ and possible candidate matching cloth C, then outputs the grading score S from 0 to 1 showing the compatibility between the candidate matching cloth and the list of clothes. The matching garments can then be ranked by the computed grading scores. As shown in FIG. 6B, the existing item 1 may be the inputted garment sweater, the existing item 2 may be a selected trench-coat, the existing item n may be a selected pair of boots, and the candidate item is a hat. Each item has a text description and an image, and features are extracted from the text description and the image. The extracted features from the text description and the text are concatenated, and the concatenated encoding $E_1$, $E_2$, $E_n$ and C are representations of the garment items. The garment pair relation between the existing cloth $E_i$ and the candidate cloth C representation is computed as ($|E_i-C|$, $E_i*C$). Then, a multi-head dot product attention layer is used to compute the interactions between each matching pair. The output of attention layer is aggregated using a max pooling layer cross the space. Some fully-connected layers are used to compress the relation representation. A softmax layer is used to predict the compatibility of the given cloth pair, and is named the grading score of the candidate item. If there are several candidate hats, then several grading scores corresponding to the several candidate hats are obtained, and the one having the highest grading score is selected as the hat in the outfit having the existing items 1 to n.

The recommendation module 134 is configured to, when the recommended outfit is available, present the outfit to the customer. The several garments in the outfit are compatible with the inputted garment, and preferably the several garments are linked to their product page on the e-commerce platform, such that the customer can purchase the several garments easily. In certain embodiments, if the customer does not provide the inputted garment, but the customer is a purchase of a garment, the recommendation module 134 may be configured to use the purchased garment as input to obtain an outfit, and push the outfit as a pop-up window or an email to the purchaser. In certain embodiments, the customer is an owner of a store on the e-commerce platform. When he has a new garment inventory in his store, the application may determine an outfit for the new garment, and provide the outfit on the store owner's website or the webpage of the new garment. In certain embodiments, the outfit preferably include one or more items from the same store which matches with the new garment well. In certain embodiments, the recommendation not only includes the generated outfit, but also the reasons for the recommendation, so that the result is explainable. For example, the matching scores between the vertices corresponding to the inputted garment and the vertices corresponding to the recommended garment represent the compatibility of the attributes of the vertices, the disclosure may list the pair of compatible attribute vertices with high edge matching score as the reasons behind recommendation results. For example, the Gray_Top and Beige_Outwear pair shown in FIG. 5 have a high matching score of 0.8, which could be listed as a top reason why the disclosure recommends the garment 506 for the inputted garment 502. The second in the list could be the Crew-Neck-Sweater and the Trench Coat pair, where the matching score is 0.65. If considering indirect connections, the second in the list can also be Sweater-Winter-Trench-Coat triple, where a combined matching score is 0.72 (0.9*0.8=0.72).

As described above, the recommendation module 134 is configured to provide an explanation of the recommendation, and the explanation behind the matching could be inferred from the knowledge graph. In certain embodiments, to extract the knowledge graph given any pair of products such as the inputted garment crew-neck sweater 502 and the recommended garment trench-coat 506, the application first obtains the labels or attributes for each product. Based on the labels, the disclosure can retrieve the corresponding vertices and edges with high matching scores as the knowledge sub-graph of the two products. The knowledge sub-graph can be provided together with the recommendation, so that the customer can understand the rational of the recommendation.

In certain embodiments, the garment recommendation application 118 may further include a managing interface 136. The managing interface 136 is configured to provide an interface for an administrator of the garment recommendation application 118 to train the models, update the models, adjust model parameters, and configured to provide an interface for a customer to use an inputted garment to query the garment recommendation application 118 to obtain an outfit containing the inputted garment. In certain embodiments, the customer can also input conditions to interact with the outfit generating process, such as define the season of the outfit, the style of the outfits, and the brand or source of the components in the outfit. In certain embodiments, the customer may also place weights on the conditions, and the higher the weights, the more restrictions the conditions on the recommendation process.

The garment recommendation application 118 is a novel framework which incorporates both data-driven results from deep learning methods and guidance as well as constraints from knowledge graph to generate accurate and explainable fashion outfit generation. In certain embodiments, the application also lists the pairs of key values with high edge weights as the reasons behind recommendation results.

Figure 7:
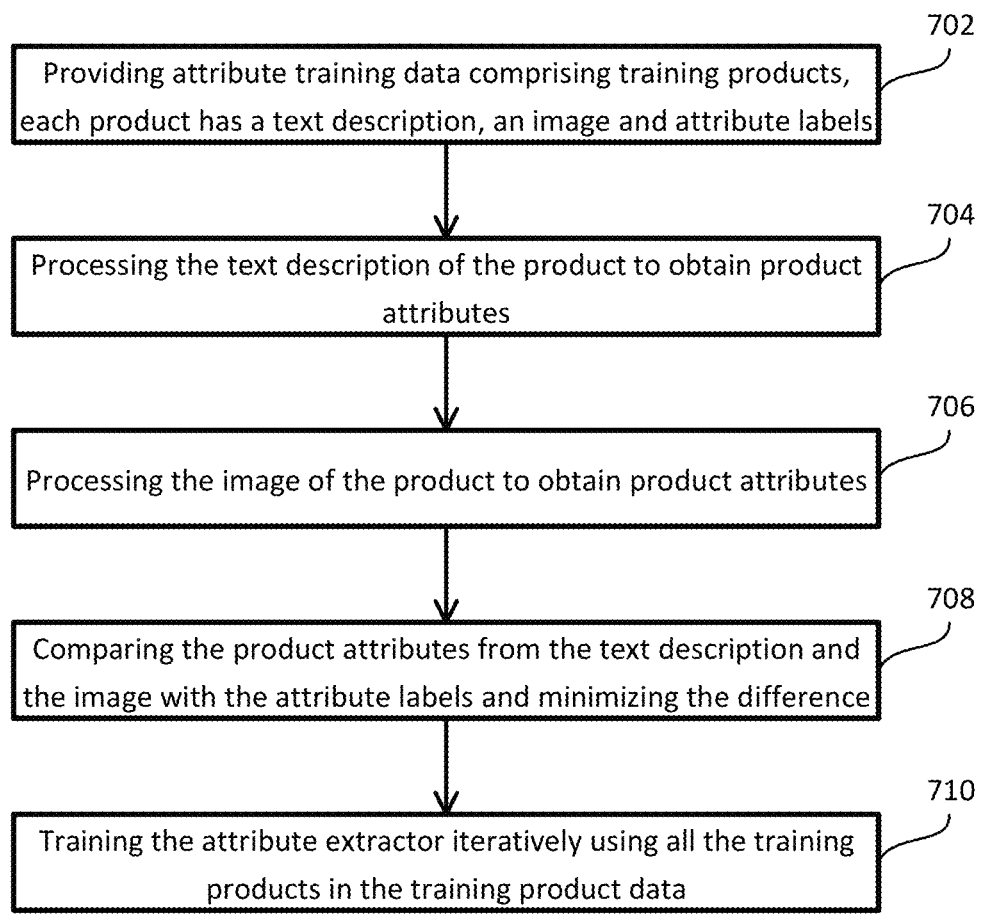
FIG. 7 schematically depicts a method for attribute extraction training according to certain embodiments of the present disclosure.

In certain aspects, the present disclosure relates to a method for training an attribute extractor. FIG. 7 schematically depict a method for training an attribute extractor according to certain embodiments of the present disclosure. In certain embodiments, the method is implemented by the computing device 110 shown in FIG. 1. In certain embodiments, the method shown in FIG. 7 corresponds to the function of the attribute extractor 120 of the garment recommendation application 118. It should be particularly noted that, unless otherwise stated in the present disclosure, the steps of the method may be arranged in a different sequential order, and are thus not limited to the sequential order as shown in FIG. 7.

At procedure 702, the attribute training data 140 is provided. The training data 140 includes a large number of training product, each of the training product has a text description of the product, an image of the product, and attribute labels of the products.

At procedure 704, the attribute extractor 120 retrieves data of one of the training product, uses an LSTM model to process the text description of the product to obtain a feature vector corresponding to the text description, and to predict attributes from the feature vector.

At procedure 706, the attribute extractor 120 further uses a CNN model to process the image of the product to obtain a feature vector corresponding to the image, and to predict attributes from the feature vector.

At procedure 708, the predicted attributes from the text description and the predicted attributes from the image are combined, and are compared with the attribute labels of the product. The comparison result is used to adjust parameters of the CNN and the LSTM models, and the process can be repeated until the difference between the predicted labels and the ground true labels are minimized or smaller than a predetermined value. In certain embodiments, the feature vectors from the text description and the image may be combined first, and the combination is used to predict the attributes. In other words, the prediction layer of the LSTM model and the prediction layer of the CNN model could be the same layer.

At procedure 710, the disclosure uses other training products from the attribute training data 140 to train the attribute extractor 120, until the model parameters are converged.

Once the attribute extractor 120 is well-trained, the model parameters can be exported to the feature extractor 122, and the feature extractor 122 is also regarded as well-trained. The main difference between the attribute extractor 120 and the feature extractor 122 is that the feature extractor 122 does not include a prediction layer in its LSTM and CNN models. In certain embodiments, the attribute extractor 120 and the feature extractor 122 can also be the same model, and the model is configured to output attributes or feature vectors according to its required functions.

Figure 8:
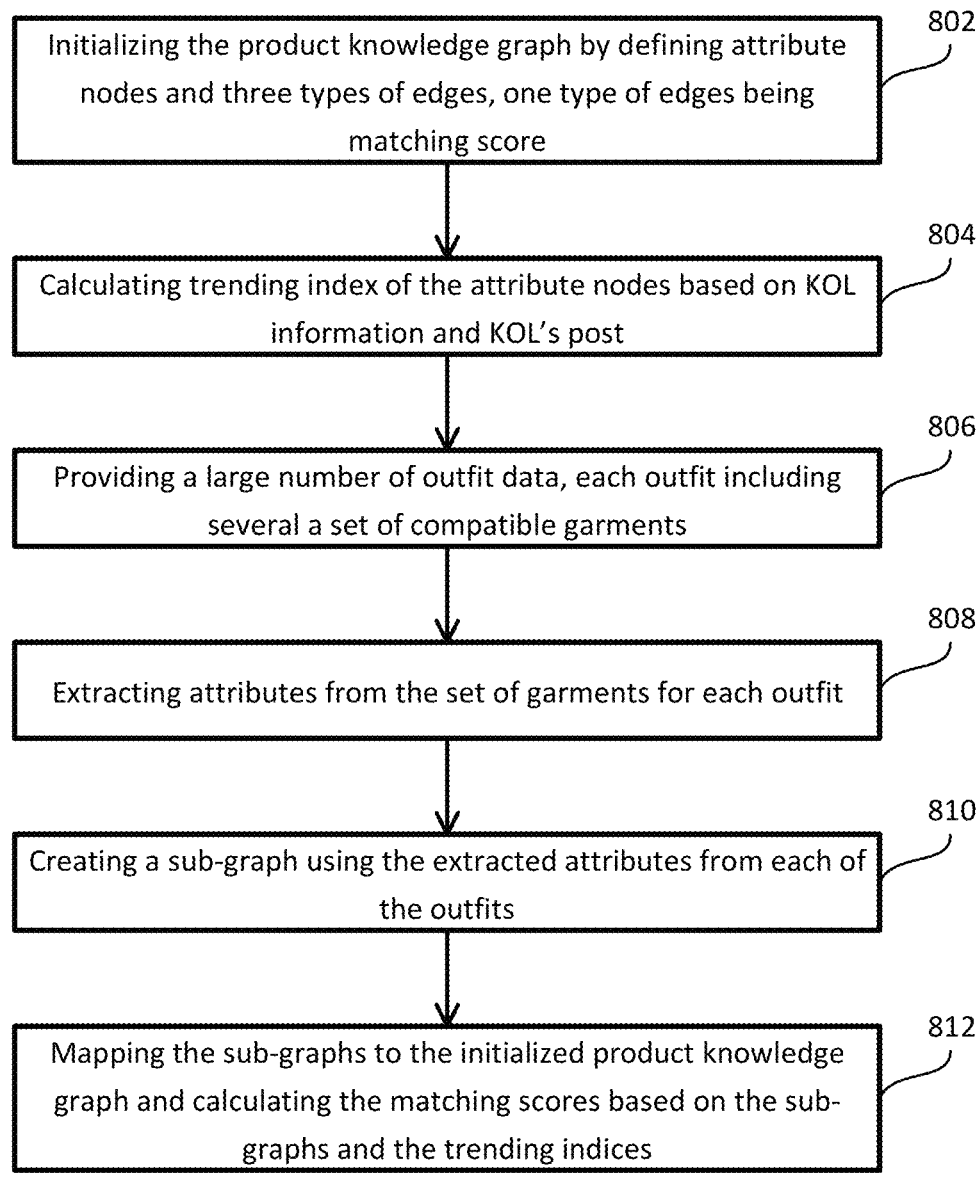
FIG. 8 schematically depicts a method for knowledge graph construction according to certain embodiments of the present disclosure.

In certain aspects, the present disclosure relates to a method for constructing a product knowledge graph. FIG. 8 schematically depict a method for constructing a product knowledge graph according to certain embodiments of the present disclosure. In certain embodiments, the method is implemented by the computing device 110 shown in FIG. 1. In certain embodiments, the method shown in FIG. 8 corresponds to the function of the knowledge graph constructor 124 of the garment recommendation application 118. It should be particularly noted that, unless otherwise stated in the present disclosure, the steps of the method may be arranged in a different sequential order, and are thus not limited to the sequential order as shown in FIG. 8.

At procedure 802, the knowledge graph constructor 124 initializes the product knowledge graph 138. The initialized product knowledge graph 138 includes different type of attribute nodes (or vertices or entities), and edges between certain nodes. The edges are defined as one of "IsA," "PartOf" and "Matching_Score" relationships.

At procedure 804, the knowledge graph constructor 124 instructs the fashion trend integrator 126 to collect KOL information and their opinions or posts, and obtain the promoted or recommended products in the opinions or posts; and instructs the attribution extractor 120 to extract attributes from the recommended products, and calculates a trending index for each of the attributes.

At procedure 806, outfit data 142 is provided. The outfit data 142 includes a large number of outfits, for example 5,000-15,000 outfits. Each outfit include several garments, and each garment has a text description and an image.

At procedure 808, the knowledge graph constructor 124 instruct the attribute extractor 120 to retrieve garments from the outfit data 142, extract attributes from the text description and the image of the garments, and send the attributions and the outfit information to the knowledge graph constructor 124. The outfit information includes products in each of the outfits.

At procedure 810, the knowledge graph constructor 124 creates a sub-graph for each outfit. The sub-graph include attribute nodes. The attribute nodes are predefined by the knowledge graph, and match with the extracted attributes of the products in the outfit. When possible, edges between the attribute nodes in the sub-graph are presented which relate to co-existence of the attributes in the same outfit.

At procedure 812, the knowledge graph constructor 124 maps the sub-graphs to the product knowledge graph 138, and calculates matching scores of the edges based on the trending index and the co-existence of the attributes in the sub-graph, so as to complete the product knowledge graph 138.

Figure 9:
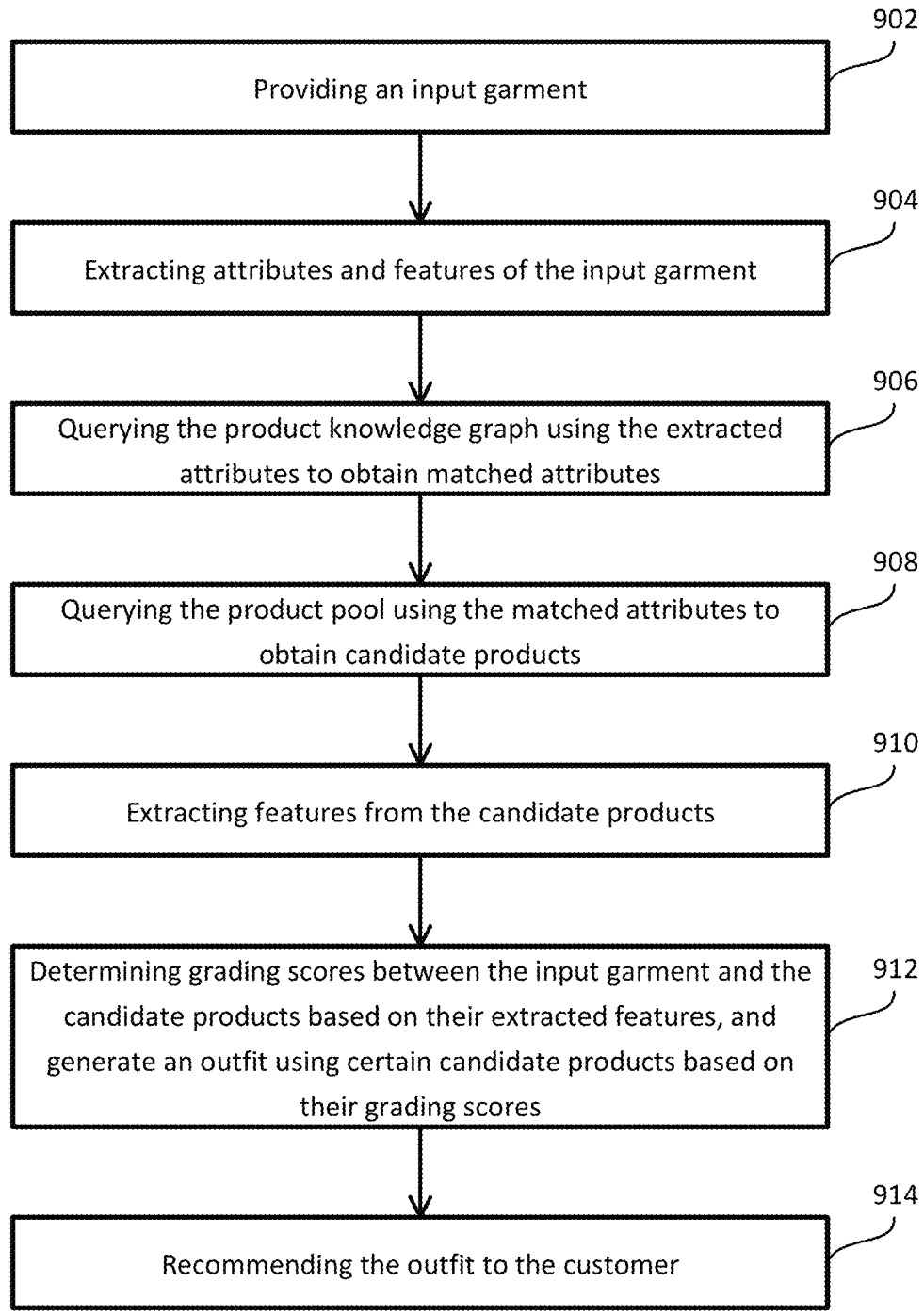
FIG. 9 schematically depicts a method for recommending a garment or an outfit having multiple garments according to certain embodiments of the present disclosure.

In certain aspects, the present disclosure relates to a method for recommending an outfit. FIG. 9 schematically depicts a method for recommending an outfit for an inputted garment according to certain embodiments of the present disclosure. In certain embodiments, the method is implemented by the computing device 110 shown in FIG. 1. In certain embodiments, the method shown in FIG. 9 corresponds to the function of the product knowledge graph application 118. It should be particularly noted that, unless otherwise stated in the present disclosure, the steps of the method may be arranged in a different sequential order, and are thus not limited to the sequential order as shown in FIG. 9.

As shown in FIG. 9, at procedure 902, a customer provides an inputted garment. When the customer is a buyer, he may enter the inputted garment that he has. When the customer is the e-commerce platform, the e-commerce platform may provide the inputted garment when a buyer purchased the inputted garment. When the customer is an owner owning a store on the e-commerce platform, the inputted garment may be a new garment the owner just added to his store. The inputted garment includes its text description and its image.

At procedure 904, upon receiving the inputted garment, the attribution extractor 120 extracts attributes from the inputted garments, and sends the extracted attributes to the knowledge graph query engine 128; and the feature extractor 122 extracts features from the inputted garments, and sends the extracted features to the matching grader 132.

At procedure 906, upon receiving the extracted attributes, the knowledge graph query engine 128 maps the extracted attributes to the product knowledge graph 138, finds the matched attributes that are compatible with the extracted attributes, and sends the matched attributes to the product pool query engine 130. In certain embodiments, the compatibility is determined based on the matching scores between the extracted attributes and the matched attributes.

At procedure 908, upon receiving the matched attributes, the product pool query engine 130 query the matched attributes against the product pool 144 to obtain candidate garments, and sends the candidate garments to the feature extractor 122. The candidate garments has attributes that are compatible with the matched attributes.

At procedure 910, upon receiving the candidate garments, the feature extractor 122 extracts features for each of the candidate garments, and sends the extracted features of the candidate garments to the matching grader 132.

At procedure 912, upon receiving the extracted features of the inputted garment from the feature extractor 122 and the extracted features of each candidate garment, the matching grader 132 calculates a grading score between the extracted features of the inputted garment and extracted features of each of the candidate garments, selects one or several of the candidate garments that has highest grading scores to form an outfit, and sends the outfit to the recommendation module 134. In certain embodiments, the matching grader 132 may define different types of outfits, each outfits include several types of garments, such as a top, a bottom, an outwear, and a pair of shoes. The matching grader 132 finds components of the outfit sequentially based on the definition of the outfit. For example, when the inputted garment is a top garment, the matching grader 132 may select all the candidate garments that are bottom garments, and select one of the bottom garments as the bottom garment in the outfit, where the grading score for the selected bottom garment is greater than the grading scores of the other bottom garments in the candidate garments. Then the matching grader 132 may select all the candidate garments that are outwear garments, and select one of the outwear garments as the outwear garment in the outfit, where the grading score for the selected outwear garment is greater than the grading scores of the other outwear garment. In certain embodiments, the grading scores are calculated using both the inputted garment and the selected top garment, as shown in FIG. 6B. After that, the matching grader 132 may further select a pair of shoes. As a result, the outfit includes the inputted garment which is a top garment, a selected bottom garment, a selected outwear, and a selected pair of shoes.

At procedure 914, upon receiving the outfit from the matching grader 132, the recommendation module 134 recommends the outfit to the customer. The recommendation may be provided by question and answer, where the question asked by a customer is to find an outfit for an inputted garment, and the answer is the outfit having several garments. The recommendation may be provided by pushing, where a customer purchased or reviewed a garment, the application uses the purchased or reviewed garment as inputted garment, infers an outfit compatible with the inputted garment, and pushes the outfit to the customer in the form of a pop-up window or email. In certain embodiments, the recommendation is provided to a store owner when the store owner has a new garment inventory, where the recommended outfit using the new garment as inputted garment is provided or pushed to the store owner.

In another aspect, the present disclosure relates to a non-transitory computer readable medium storing computer executable code. The code, when executed at a processer of a computing device, may perform the methods as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

In certain aspects, the present disclosure relates to alternative methods for studying fashion outfit composition. In certain embodiments, an alternative method may choose to use deep learning network to get the latent features from garments and use the latent features to infer the compatibility. However, the method cannot give an explanation why two garments are compatible except a score from trained model. It fails to provide a detailed explanation between fashion attributes and context information.

In certain embodiments, another alternative method may employ the feature tensor decomposition which split the latent feature into several parts each of which represents a specific semantic meaning. Then, the method infers the matching reason by analyzing the effect from different feature parts on the final matching score. The alternative method may give consumers the final matching score, as well as the color/shape compatibility, which could be taken as matching explanation. However, there are still drawbacks to these kinds of methods: (1) In the explanation, these methods only cover few attributes, like color and shape. But, to measure the garment compatibility, we need to take more attributes into account, such as pattern, collar type and sleeve type. Moreover, it requires large amount of training data to expand their current framework to contain more attributes requires a large amount of data for training. (2) The training of their recommendation models highly relies on the data they use, which will cause the recommendation results to be biased and lack of variety. (3) These methods could not capture the relation between cloth attributes and context information such as the human characteristic, season and occasion.

In certain embodiments, yet another alternative method utilizes the fashion knowledge graph for fashion recommendation. The method builds a fashion knowledge graph containing garment knowledge as well as contexts entities and try to capture the intrinsic correlation between clothing attributes and context attributes. The method recommends garments based on the relation between the cloth and context information. However, (1) the method only consider the static knowledge, but failed to consider he fast changing fashion trends; (2) in the method, the relation between items is not taken in account, which lowers the recommendation accuracy. For example, the T-shirt and Shorts are both compatible with Summer, but whether a T-shirt is a good match to a Shorts is decided mainly by the correlation of attributes between two specific products; (3) build a complete with only rule-based methods is time-consuming. Moreover, some edges' weights are hard to assign; (4) the recommendation results from knowledge graph are only attribute words. To get the real product results, these methods usually rely on the keywords searching which bring more noise and uncertainty; (5) these method only captures the relation between single attribute factors. However, as mention above, we need to take the multiple attributes factors together into account.

In certain embodiments, yet another alternative method may build knowledge graph whose nodes represent real products. Then the method uses graph convolution network which directly encoder the node into an embedding vector. This vector could be used for searching and compatibility calculation based on end2end training strategies. Further, another direction of an alternative method is to solve the problem combing knowledge graph and deep learning methods together by training both parts together. The method may ensure that the knowledge from graph could be directly used by the recommendation system. However, the joint training also makes the mode hard to train and requires more data to learn.

Comparing with those alternative methods, the embodiments described above in relation to the figures is that the embodiments integrate both dynamic and static fashion knowledge and employ a one-by-one strategy in which the knowledge graph building and final inferencing is separated which reduces the difficulties of training as well as the demands of data. The embodiments of the present disclosure (1) address the fast changing styles and trends in fashion domain by incorporating a trend index to the matching scores; (2) provide extensibility and reasoning ability; and (3) consider fine-grained feature and real products.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for determining a target garment matching an inputted garment, comprising:
    providing an attribute extractor comprising a convolutional neural network (CNN);
    training, by a computing device, the attribute extractor by using attribute training data, wherein the training comprises:
        providing the attribute training data, wherein the attribute training data comprises a plurality of training products, and each training product of the plurality of training products has a text description of the training product, an image of the training product, and an attribute label of the training product;
        processing the text description of each of the plurality of training products to obtain a predicted product attribute corresponding to the text description of each of the plurality of training products;
        processing, by the CNN, the image of each of the plurality of training products;
        converting, by a prediction layer of the CNN, latent vector representations from a CNN result to a predicted product attribute corresponding to the image of each of the plurality of training products; and
        training the attribute extractor by using the predicted product attribute corresponding to the text description of each of the plurality of training products, the predicted product attribute corresponding to the image of each of the plurality of training products, and the attribute label of each of the plurality of training products;
    receiving, by the computing device, the inputted garment;
    extracting, by the trained attribute extractor in the computing device, attributes from a text description and an image of the inputted garment to obtain extracted attributes;
    querying, by the computing device, a knowledge graph using the extracted attributes to obtain matched attributes;
    retrieving, by the computing device, candidate products from a garment pool using the matched attributes;
    extracting, by the computing device, features from the inputted garment and the candidate products;
    determining, by the computing device, the target garment from the candidate products based on grading scores between the features of the inputted garment and the features of the candidate products;
    pushing, by the computing device, the target garment to a terminal of a user who purchased or reviewed the inputted garment; and
    presenting, by the terminal of the user, the target garment to the user,
    wherein the knowledge graph comprises nodes corresponding to a type of clothes, a category of clothes, attribute keys comprising sleeve-length, color, pattern, and dress length, values of the attribute keys comprising short-sleeve, red and blue, context keys comprising gender, season and style, values of the context keys comprising woman, summer and casual, a combination of the values of the attribute keys and the type of clothes, and a combination of the values of the attribute keys and the category of clothes, wherein the knowledge graph comprises edges between the nodes, the edges comprising an "IsA" relationship representing that an attribute of one of the nodes belongs to a category of an attribute of another one of the nodes, a "PartOf" relationship representing that attribution of one of the nodes is part of an attribute of another one of the nodes, and a "Matching_Score" relationship representing compatibility between attribution of two nodes, wherein matching score values of "Matching_Score" relationships are optimized using one or more garment outfit opinions from key opinion leaders (KOLs), and wherein a matching score value is a current matching score between a first node and a second node after training using a training outfit, and the current matching score is determined based on a previous matching score between the first node and the second node, a trending index of the first node, and a trending index of the second node.

2. The method of claim 1, wherein the matching score values are determined by:

$$p(node_i, node_j) = (p'(node_i, node_j)+1)*T_i*T_j,$$

wherein $p'(node_i, node_j)$ is a previous matching score between a node i and a node j, $p(node_i, node_j)$ is a current matching score between the node i and the node j after training using the training outfit, $T_i$ is a trending index of the node i, and $T_j$ is a trending index of the node j.

3. The method of claim 2, wherein each trending index is determined by:

$$T_i = \Sigma_{j=1}^{V} o(i,j,k)*KI_k$$

wherein $$o(i, j, k) = \begin{cases} 1, & \text{if a } k_{th} \text{ KOL recommends an } i_{th} \text{ entity in a clothing } C_j \\ 0, & \text{otherwise} \end{cases},$$

$T_i$ is a trending index of an ith node or entity, $KI_k$ is an impact index of a kth of a total of n key opinion leaders (KOLs) calculated by $$KI_k = \frac{F_k}{\max(F_1, F_2, \ldots, F_n)},$$

$F_k$ is a total number of followers of the kth KOL, and $C_j$ is a jth of a total of V number of garments recommended by the KOLs.

4. The method of claim 1, wherein the step of querying the knowledge graph further comprises providing a condition to narrow or expand the matched attributes, and the condition comprises season of the target garment and style of the target garment.

5. The method of claim 1, wherein the step of extracting features is performed using at least one of the convolutional neural network (CNN) and a long-short term memory (LSTM).

6. The method of claim 1, wherein at least one of one or more nodes corresponding to the extracted attributes and at least one of one or more nodes corresponding to the matched attributes have a matching score value of the "Matching_Score" relationship, and the matching score value is greater than a predetermined threshold.

7. The method of claim 1, further comprising: providing an explanation for recommending the target garment based on matching between the extracted attributes and the matched attributes.

8. The method of claim 1, wherein the target garment is an outfit comprising a plurality of garments compatible to the inputted garment.

9. The method of claim 8, wherein at least one of the plurality of garments is determined based on the inputted garment and one or more others of the plurality of garments.

10. A system for determining a target garment matching an inputted garment, wherein the system comprises a computing device, the computing device comprises a processor and a storage device storing computer executable code, and the computer executable code, when executed at the processor, is configured to:

provide an attribute extractor comprising a convolutional neural network (CNN);

train the attribute extractor by using attribute training data, wherein the training comprises:

providing the attribute training data, wherein the attribute training data comprises a plurality of training products, and each training product of the plurality of training products has a text description of the training product, an image of the training product, and an attribute label of the training product;

processing the text description of each of the plurality of training products to obtain a predicted product attribute corresponding to the text description of each of the plurality of training products;

processing, by the CNN, the image of each of the plurality of training products;

converting, by a prediction layer of the CNN, latent vector representations from a CNN result to a predicted product attribute corresponding to the image of each of the plurality of training products; and training the attribute extractor by using the predicted product attribute corresponding to the text description of each of the plurality of training products, the predicted product attribute corresponding to the image of each of the plurality of training products, and the attribute label of each of the plurality of training products;

receive the inputted garment;

extract, by using the trained attribute extractor, attributes from a text description and an image of the inputted garment to obtain extracted attributes;

query a knowledge graph using the extracted attributes to obtain matched attributes;

retrieve candidate products from a garment pool using the matched attributes;

extract features from the inputted garment and the candidate products;

determine the target garment from the candidate products based on grading scores between the features of the inputted garment and the features of the candidate products; and push the target garment to a terminal of a user who purchased or reviewed the inputted garment, wherein the target garment is presented to the user by the terminal of the user, wherein the knowledge graph comprises nodes corresponding to a type of clothes, a category of clothes, attribute keys comprising sleeve-length, color, pattern, and dress length, values of the attribute keys comprising short-sleeve, red and blue, context keys comprising gender, season and style, values of the context keys comprising woman, summer and casual, a combination of the values of the attribute keys and the type of clothes, and a combination of the values of the attribute keys and the category of clothes, wherein the knowledge graph comprises edges between the nodes, the edges comprising an "IsA" relationship representing that an attribute of one of the nodes belongs to a category of an attribute of another one of the nodes, a "PartOf" relationship representing that attribution of one of the nodes is part of an attribute of another one of the nodes, and a "Matching_Score" relationship representing compatibility between attribution of two nodes, wherein matching score values of "Matching_Score" relationships are optimized using one or more garment outfit opinions from key opinion leaders (KOLs), and wherein a matching score value is a current matching score between a first node and a second node after training using a training outfit, and the current matching score is determined based on a previous matching score between the first node and the second node, a trending index of the first node, and a trending index of the second node.

11. The system of claim 10, wherein the matching score values are determined by:

$$p(node_i, node_j) = (p'(node_i, node_j) + 1) * T_i * T_j,$$

wherein $p'(node_i, node_j)$ is a previous matching score between a node i and a node j, $p(node_i, node_j)$ is a current matching score between the node i and the node j after training using the training outfit, $T_i$ is a trending index of the node i, and $T_j$ is a trending index of the node j.

12. The system of claim 11, wherein each trending index is determined by:

$$T_i = \Sigma_{j=1}^{V} o(i,j,k) * KI_k$$

wherein $$o(i, j, k) = \begin{cases} 1, & \text{if a } k_{th} \text{ KOL recommends an } i_{th} \text{ entity in a clothing } C_j \\ 0, & \text{otherwise} \end{cases},$$

$T_i$ is a trending index of an ith node or entity, $KI_k$ is an impact index of a kth of a total of n key opinion leaders (KOLs) calculated by $$KI_k = \frac{F_k}{\max(F_1, F_2, \ldots, F_n)},$$

$F_k$ is a total number of followers of the kth KOL, and $C_j$ is a jth of a total of V number of garments recommended by the KOLs.

13. The system of claim 10, wherein the computer executable code is configured to extract features from the text description using a long-short term memory (LSTM), and extract features from the image using the convolutional neural network (CNN).

14. A non-transitory computer readable medium storing computer executable code, wherein the computer executable code, when executed at a processor of a computing device, is configured to:

provide an attribute extractor comprising a convolutional neural network (CNN);

train the attribute extractor by using attribute training data, wherein the training comprises:

providing the attribute training data, wherein the attribute training data comprises a plurality of training products, and each training product of the plurality of training products has a text description of the training product, an image of the training product, and an attribute label of the training product;

processing the text description of each of the plurality of training products to obtain a predicted product attribute corresponding to the text description of each of the plurality of training products;

processing, by the CNN, the image of each of the plurality of training products;

converting, by a prediction layer of the CNN, latent vector representations from a CNN result to a predicted product attribute corresponding to the image of each of the plurality of training products; and training the attribute extractor by using the predicted product attribute corresponding to the text description of each of the plurality of training products, the predicted product attribute corresponding to the image of each of the plurality of training products, and the attribute label of each of the plurality of training products;

receive an inputted garment;

extract, by using the trained attribute extractor, attributes from a text description and an image of the inputted garment to obtain extracted attributes;

query a knowledge graph using the extracted attributes to obtain matched attributes;

retrieve candidate products from a garment pool using the matched attributes;

extract features from the inputted garment and the candidate products;

determine a target garment from the candidate products based on grading scores between the features of the inputted garment and the features of the candidate products; and push the target garment to a terminal of a user who purchased or reviewed the inputted garment;

wherein the target garment is presented to the user by the terminal of the user, wherein the knowledge graph comprises nodes corresponding to a type of clothes, a category of clothes, attribute keys comprising sleeve-length, color, pattern, and dress length, values of the attribute keys comprising short-sleeve, red and blue, context keys comprising gender, season and style, values of the context keys comprising woman, summer and casual, a combination of the values of the attribute keys and the type of clothes, and a combination of the values of the attribute keys and the category of clothes, wherein the knowledge graph comprises edges between the nodes, the edges comprising an "IsA" relationship representing that an attribute of one of the nodes belongs to a category of an attribute of another one of the nodes, a "PartOf" relationship representing that attribution of one of the nodes is part of an attribute of another one of the nodes, and a "Matching_Score" relationship representing compatibility between attribution of two nodes, wherein matching score values of "Matching_Score" relationships are optimized using one or more garment outfit opinions from key opinion leaders (KOLs), and wherein a matching score value is a current matching score between a first node and a second node after training using a training outfit, and the current matching score is determined based on a previous matching score between the first node and the second node, a trending index of the first node, and a trending index of the second node.

15. The non-transitory computer readable medium of claim 14, wherein the matching score values are determined by:

$$p(node_i, node_j) = (p'(node_i, node_j) + 1) * T_i * T_j,$$

wherein $p'(node_i, node_j)$ is a previous matching score between a node i and a node j, $p(node_i, node_j)$ is a current matching score between the node i and the node j after training using the training outfit, $T_i$ is a trending index of the node i, and $T_j$ is a trending index of the node j;

wherein each trending index is determined by:

$$T_i = \Sigma_{j=1}^{V} o(i,j,k) * KI_k$$

wherein $$o(i, j, k) = \begin{cases} 1, & \text{if a } k_{th} \text{ KOL recommends an } i_{th} \text{ entity in a clothing } C_j \\ 0, & \text{otherwise} \end{cases},$$

$T_i$ is a trending index of an ith node or entity, $KI_k$ is an impact index of a kth of a total of n key opinion leaders (KOLs) calculated by $$KI_k = \frac{F_k}{\max(F_1, F_2, \ldots, F_n)},$$

$F_k$ is a total number of followers of the kth KOL, and $C_j$ is a jth of a total of V number of garments recommended by the KOLs.

\* \* \* \* \*